United States Patent
Seo et al.

(10) Patent No.: US 11,225,178 B2
(45) Date of Patent: Jan. 18, 2022

(54) SLIM HEADREST DEVICE

(71) Applicants: Hyundai Motor Company, Seoul (KR); Kia Motors Corporation, Seoul (KR); WOOBO TECH CO., LTD., Pyeongtaek-si (KR); WOOIL INDUSTRY, Hwaseong-si (KR)

(72) Inventors: Sang Man Seo, Suwon-Si (KR); In Ki Park, Ansan-Si (KR); Hae Il Jeong, Incheon (KR)

(73) Assignees: Hyundai Motor Company, Seoul (KR); Kia Motors Corporation, Seoul (KR); WOOBO TECH CO., LTD., Pyeongtaek- si (KR); WOOIL INDUSTRY, Hwaseong-si (KR)

( * ) Notice: Subject to any disclaimer, the term of this patent is extended or adjusted under 35 U.S.C. 154(b) by 0 days.

(21) Appl. No.: 16/879,200

(22) Filed: May 20, 2020

(65) Prior Publication Data

US 2021/0122275 A1 Apr. 29, 2021

(30) Foreign Application Priority Data

Oct. 24, 2019 (KR) .................. 10-2019-0132992

(51) Int. Cl.
*B60N 2/815* (2018.01)
*B60N 2/818* (2018.01)
*B60N 2/865* (2018.01)
*B60N 2/80* (2018.01)

(52) U.S. Cl.
CPC ............. *B60N 2/815* (2018.02); *B60N 2/818* (2018.02); *B60N 2/865* (2018.02); *B60N 2002/899* (2018.02)

(58) Field of Classification Search
CPC ............................... B60N 2/865; B60N 2/815
See application file for complete search history.

(56) References Cited

U.S. PATENT DOCUMENTS

| 5,882,071 | A * | 3/1999 | Fohl | B60N 2/865 |
| | | | | 297/216.12 |
| 8,950,815 | B2 * | 2/2015 | Wang | B60N 2/865 |
| | | | | 297/410 |
| 9,085,253 | B2 * | 7/2015 | Delling | B60N 2/891 |
| 9,566,884 | B2 * | 2/2017 | Line | B60N 2/821 |
| 10,238,215 | B2 * | 3/2019 | Peterson | A47C 31/023 |
| 10,500,997 | B2 * | 12/2019 | Maloney | B60N 2/829 |
| 2002/0093231 | A1 * | 7/2002 | Estrada | B60N 2/888 |
| | | | | 297/216.12 |
| 2019/0184878 | A1 * | 6/2019 | Milner | B60N 2/829 |

FOREIGN PATENT DOCUMENTS

DE 10138248 C1 * 12/2002 ............. B60N 2/888
KR 10-2007-0031490 A 3/2007

* cited by examiner

*Primary Examiner* — David R Dunn
*Assistant Examiner* — Tania Abraham
(74) *Attorney, Agent, or Firm* — Morgan, Lewis & Bockius LLP

(57) ABSTRACT

A slim headrest device may include a fixed guide bracket provided upside a seatback; a moving plate, a first end portion of which is moved forward and rearward by being guided by the fixed guide bracket and a second end portion of which is in a shape bent upward; and a moving guide bracket to which a headrest is mounted, the moving guide bracket being moved upwardly and downwardly by being guided by the second end portion of the moving plate.

13 Claims, 20 Drawing Sheets

SLIM HEADREST DEVICE

CROSS REFERENCE TO RELATED APPLICATION

The present application claims priority to Korean Patent Application No. 10-2019-0132992, filed Oct. 24, 2019, the entire contents of which is incorporated herein for all purposes by this reference.

BACKGROUND OF THE INVENTION

Field of the Invention

The present invention relates to a slim headrest device, wherein the thickness of a headrest is slim and operability by the forward/rearward and upward/downward adjustments of the headrest is improved by improving the forward/rearward and upward/downward adjustment structure of the headrest device.

Description of Related Art

The seat of a vehicle includes a seat cushion supporting the lower body of a passenger, a seatback supporting the upper body of a passenger, and a headrest supporting the rear of a passenger's head to prevent neck injuries.

Accordingly, a pair of stays are provided in the headrest by protruding downward therefrom to be inserted to an interior of the seatback from an upper end portion thereof, a guide is provided at the upper end portion of the seatback to guide the upward/downward movements of each of the stays, and a height adjustment device is provided to make the height adjustment of the headrest by restraining the protruding length of the stay.

Furthermore, there are provided a sliding device configured for adjusting the position of the headrest forward and rearward thereof, and an active headrest device configured for automatically adjusting the headrest to an optimal position during vehicle collision.

However, as for a conventional headrest, the size of a forward/rearward adjustment mechanism is large, and thus the external shape of the headrest is thick. Accordingly, the design of a slim headrest is difficult to implement.

As for the forward/rearward adjustment mechanism of the conventional headrest, the headrest is not locked at a forefront thereof and is easily returned to an initial position thereof by rotational inertia when the headrest is forcibly moved forward thereof.

Furthermore, as for the upward/downward adjustment mechanism of the conventional headrest, the stay is a structure locked to a guide molded by injection, and the molded guide may change in dimension depending on environmental conditions. When a contact portion of the guide with the stay becomes loose, rattling noise may be generated, and when a contact portion of the guide with the stay becomes close, an operational force becomes excessive.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a slim headrest device, wherein the thickness of a headrest is slim and operability by the forward/rearward and upward/downward adjustments of the headrest is improved by improving the forward/rearward and upward/downward adjustment structure of the headrest device.

In various aspects of the present invention, there is provided a slim headrest device including: a fixed guide bracket provided upside a seatback; a moving plate, a first end portion of which is moved forward and rearward by being guided by the fixed guide bracket and a second end portion of which is in a shape bent upward; and a moving guide bracket to which a headrest is mounted, the moving guide bracket being moved upwardly and downwardly by being guided by the second end portion of the moving plate.

The device may further include: a first ratchet rotatably mounted to the fixed guide bracket; a first ratchet gear provided in the moving plate, the first ratchet gear defining a holding structure in cooperation with the first ratchet as a shape of allowing a forward movement of the moving plate and limiting a rearward movement thereof; and a first plate spring allowing the rearward movement of the moving plate by releasing the first ratchet from the first ratchet gear as the first plate spring is rotated in cooperation with the first ratchet by coming into contact with the first ratchet at a position of maximum forward movement of the moving plate.

An operation space portion may be provided by having a middle portion of the moving plate drilled; the first ratchet may be provided in a middle portion of the operation space portion; the first ratchet gear may be provided on an internal wall surface of the operation space portion; and the first plate spring may be provided along the first ratchet gear.

The first ratchet may have a hinge shaft combined thereto in a direction orthogonal to a moving direction of the moving plate to be rotated; and the first ratchet gear may be provided at a position opposite to the first ratchet such that the first ratchet is held therein, the first ratchet gear being provided in plural along the moving direction of the moving plate such that the first ratchet is held therein in a plurality of levels.

A holding protrusion of a wedge shape may be provided at a first end portion of the first ratchet; and the first ratchet gear may have a support surface provided therein in a direction orthogonal to the moving direction of the moving plate, wherein an inclined surface may be slantingly provided rearward from an internal end portion of the support surface to have a tooth shape.

The device may further include: a first locking spring supplying an elastic force in a rotation direction of the first ratchet, the first locking spring supplying an elastic force by changing in any one rotation direction of a rotation direction of a holding protrusion of the first ratchet being held in the first ratchet gear and a rotation direction of the holding protrusion thereof being released from being held in the first ratchet gear as a rotational displacement of the first ratchet changes.

A push protrusion may be provided in a second end portion of the first ratchet; a release protrusion may be provided at a second end portion of the first plate spring opposite to the push protrusion, so that the release protrusion may be in contact with and is pressed by the push protrusion; and the first plate spring may be rotated while being moved forward by being guided by the moving plate when the release protrusion is pressed by the push protrusion.

A guide protrusion may be provided in the moving plate by protruding therefrom toward the first plate spring; a guide hole may be provided in the first plate spring in a longitudinal direction thereof along forward/rearward moving directions thereof; and the guide protrusion may be inserted into the guide hole, so that the first plate spring may be moved by being guided along the guide hole.

A rotation protrusion may be provided at a second end portion of the first plate spring toward the moving plate, the rotation protrusion being provided at a second end portion of the moving plate opposite to the rotation protrusion by having a long groove portion and a short groove portion provided to be different in front to rear lengths along a rotation direction of the first plate spring to have a step; and a width of the long groove portion may be configured to be longer than a width of the rotation protrusion, so that the rotation protrusion may be rotated in a direction of the short groove portion inside the long groove portion relative to the guide protrusion by operation of the push protrusion being pressed by the release protrusion.

A locking operation protrusion may be provided in a middle portion of the first plate spring, wherein the locking operation protrusion may be positioned to overlap a portion of a gear groove provided at a rearmost portion of the first ratchet gear while the rotation protrusion is rotated in the long groove portion by pressing of the release protrusion; and the holding protrusion provided at the first end portion of the first ratchet may push the locking operation protrusion forward by being moved forward along an inclined surface of the rearmost gear groove, so that the first plate spring may be moved forward thereof.

In a process in which the first plate spring is moved to the front portion of the moving plate from the rear portion thereof, the rotation protrusion may be moved into the short groove portion from the long groove portion while the first plate spring is rotated relative to the guide protrusion; and in a process in which the first plate spring is moved to the rear portion of the moving plate from the front portion thereof, the rotation protrusion may be moved into the long groove portion from the short groove portion while the first plate spring is rotated relative to the guide protrusion.

As the push protrusion is pressed by the release protrusion with the rotation protrusion positioned inside the short groove portion, the first ratchet may be rotated and released from the first ratchet gear.

A release press portion may be provided in a front of the moving plate opposite to the first end portion of the first ratchet, so that the release press portion may contact with and be pressed by the first end portion of the first ratchet; and the first ratchet may be rotated and held in the first ratchet gear as the release press portion is pressed by the first end portion of the first ratchet.

A ratchet guide surface may be provided on an external surface of the first ratchet continuing to the second end portion thereof from the first end portion thereof, wherein a first section having the holding protrusion of the first ratchet of the ratchet guide surface may be configured as a flat surface, a second section continuing to the first section may be configured as a convex surface, and a third section continuing to the second section may be configured as a flat surface; and a plate guide surface of a shape corresponding to the ratchet guide surface may be provided on i an internal surface of the release press portion opposite to the ratchet guide surface, so rotation of the first ratchet may be guided while the ratchet guide surface is in contact with the plate guide surface.

A release operation protrusion may be provided in the first end portion of the first plate spring; the release operation protrusion may be located to overlap a portion of the gear groove provided at a front of the first ratchet gear when the release press portion is located at a position of being pressed by the first end portion of the first ratchet; and the holding protrusion provided at the first end portion of the first ratchet may press the release operation protrusion located inside the gear groove as the release press portion presses the first end portion of the first ratchet, so that the first plate spring may be moved rearward while being rotated to a locking operation position relative to a guide protrusion.

The device may further include: a first return spring supplying an elastic force in a rearward moving direction of the first plate spring.

A bearing structure may be provided between the fixed guide bracket and the moving plate to slide the moving plate forward and rearward thereof.

The bearing structure may include: a ball case formed in a shape of covering a side edge portion of the moving plate and having a ball hole provided in a longitudinal direction thereof and a ball fitted into the ball hole, a spheric surface of the ball of a side relative to the ball hole being roll-supported by the moving plate and a spheric surface of the ball of an opposite side of the side being roll-supported by an internal surface of the fixed guide bracket.

The device may further include: a second ratchet rotatably mounted to the moving guide bracket; a second ratchet gear provided in the moving plate, the second ratchet gear defining a holding structure in cooperation with the second ratchet as a shape of allowing an upward movement of the moving guide bracket and limiting a downward movement thereof; and a second plate spring allowing a downward movement of the moving guide bracket by releasing the second ratchet from the second ratchet gear by rotating in cooperation with the second ratchet by coming into contact with the second ratchet at a position of maximum upward movement of the moving guide bracket the moving guide bracket.

An operation space portion may be provided by having a middle portion of the second end portion of the moving plate drilled; the second ratchet may be provided in a middle portion of the operation space portion; the second ratchet gear may be provided on an internal wall surface of the operation space portion; and the second plate spring may be provided along the second ratchet gear.

The second ratchet may have a hinge shaft combined thereto in a direction orthogonal to a moving direction of the moving guide bracket to perform hinge rotation, and the second ratchet gear may be provided at a position opposite to the second ratchet such that the second ratchet is held therein and is provided in plural along the moving direction of the moving guide bracket such that the second ratchet is held therein in a plurality of levels.

A holding protrusion of a wedge shape may be provided at a first end portion of the second ratchet; and the second ratchet gear may have a support surface provided therein in a direction orthogonal to the moving direction of the moving guide bracket, wherein an inclined surface may be slantingly provided upwards from an internal end portion of the support surface to have a tooth shape.

The device may further include: a second locking spring supplying an elastic force in a rotation direction of the second ratchet, the second locking spring supplying an elastic force by changing in any one rotation direction of a rotation direction of the holding protrusion of the second ratchet being held in the second ratchet gear and a rotation direction of the holding protrusion thereof being released from being held in the second ratchet gear as a rotational displacement of the second ratchet changes.

A push protrusion may be provided at a second end portion of the second ratchet; a release protrusion may be provided at a second end portion of the second plate spring opposite to the push protrusion, so that the release protrusion may be in contact with and pressed by the push protrusion; and the second plate spring may be rotated while being moved downwards by being guided by the moving plate when the release protrusion is pressed by the push protrusion.

A guide protrusion may be provided in the moving plate by protruding therefrom toward the second plate spring; a guide hole may be provided in the second plate spring in a longitudinal direction thereof along upward/downward moving directions thereof, and the guide protrusion may be inserted into the guide hole, so that the second plate spring may be moved by being guided along the guide hole.

A rotation protrusion may be provided at a second end portion of second plate spring toward the moving plate, wherein the rotation protrusion may be provided at an upper end portion of the moving plate opposite to the rotation protrusion by having a long groove portion and a short groove portion provided to be different in perpendicular lengths along a rotation direction of the first plate spring to have a step; and a width of the long groove portion may be configured to be longer than a width of the rotation protrusion, so that the rotation protrusion may be rotated in a direction of the short groove portion inside the long groove portion relative to the guide protrusion by operation of the push protrusion being pressed by the release protrusion.

A locking operation protrusion may be provided in the middle portion of second plate spring, wherein the locking operation protrusion may be positioned to overlap a portion of the gear groove provided at an uppermost portion of the second ratchet gear while a rotation protrusion is rotated in the long groove portion by pressing of the release protrusion; and a holding protrusion provided at the first end portion of the second ratchet may push the locking operation protrusion downward by being moved downwards along an inclined surface of an uppermost gear groove, so that the second plate spring may be moved downward.

In the process in which the second plate spring is moved to a lower portion of the moving plate from an upper portion thereof, the rotation protrusion may be moved into the short groove portion from the long groove portion while the second plate spring is rotated relative to the guide protrusion; and in the process in which the second plate spring is moved to the upper portion of the moving plate from the lower portion thereof, the rotation protrusion may be moved into the long groove portion from the short groove portion while the second plate spring is rotated relative to the guide protrusion.

As the push protrusion is pressed by the release protrusion with the rotation protrusion positioned inside the short groove portion, the second ratchet may be rotated and released from the second ratchet gear.

A release press portion may be provided in a lower portion of the moving plate opposite to a first end portion of the second ratchet, so that the first end portion of the second ratchet may contact with and be pressed by the release press portion; and the second ratchet may be rotated and held in the second ratchet gear as the first end portion of the second ratchet is pressed by the release press portion.

A ratchet guide surface may be provided on an external surface of the second ratchet continuing to a second end portion thereof from the first end portion thereof, wherein a first section having the holding protrusion of the second ratchet of the ratchet guide surface may be configured as a flat surface, a second section continuing to the first section may be configured as a convex surface, and a third section continuing to the second section may be configured as a flat surface; and a plate guide surface of a shape corresponding to the ratchet guide surface may be provided at a portion of the moving plate opposite to the ratchet guide surface Fr, so that the rotation of the second ratchet may be guided while the ratchet guide surface-contacts with the plate guide surface.

A release operation protrusion may be provided in the first end portion of the second plate spring; the release operation protrusion may be located to overlap a portion of a gear groove provided in a lower portion of the second ratchet gear when the first end portion of the second ratchet is located at a position of being pressed by the release press portion; and the holding protrusion provided at the first end portion of the second ratchet may press the release operation protrusion located inside the gear groove as the first end portion of the second ratchet presses the release press portion, so that the second plate spring may be moved upward while being rotated to a locking operation position relative to a guide protrusion.

The device may further include: a second return spring supplying an elastic force in an upward moving direction of the second plate spring.

According to various aspects of the present invention, there is provided a slim headrest device including: the fixed guide bracket provided upside the seatback; the moving plate to which a headrest is mounted, the first end portion of the moving plate being moved forward and rearward by being guided by the fixed guide bracket and the second end portion thereof being formed in a shape bent upwards.

According to yet another aspect of the present invention, there is provided a slim headrest device including: the fixed guide bracket provided upside the seatback, the headrest being mounted to a first end portion of the fixed guide bracket; and the moving guide bracket being moved upwardly and downwardly by being guided by a second end portion of the fixed guide bracket.

According to yet another aspect of the present invention, there is provided a slim headrest device including: the fixed guide bracket provided upside the seatback; and the moving plate, the first end portion of which is moved upwardly and downwardly by being guided by the fixed guide bracket and the second end portion of which has the headrest mounted thereto.

The device may further include: the moving guide bracket, a first end portion of which has the headrest mounted thereto and a second end portion of which is moved forward and rearward by being guided by the second end portion of the moving plate, wherein the second end portion of the moving plate may be formed in a shape bent forward or rearward thereof.

Through the above-mentioned means for solving the problems, in an exemplary embodiment of the present invention, the thickness of the headrest is slim by improving the design of a headrest device by compacting the forward/rearward and upward/downward adjustment mechanism of the headrest. Accordingly, there is an effect of maximizing advantages in terms of cost, weight, and layout due to the product slimming.

Furthermore, even when the headrest is forcibly pushed during the movement of the headrest to the forefront, the first ratchet is not released from the first ratchet gear by rotational inertia, but is held in the first ratchet gear located at the forefront, so operability by the forward/rearward adjustments of the headrest is improved.

The methods and apparatuses of the present invention have other features and advantages which will be apparent

Figure 1:
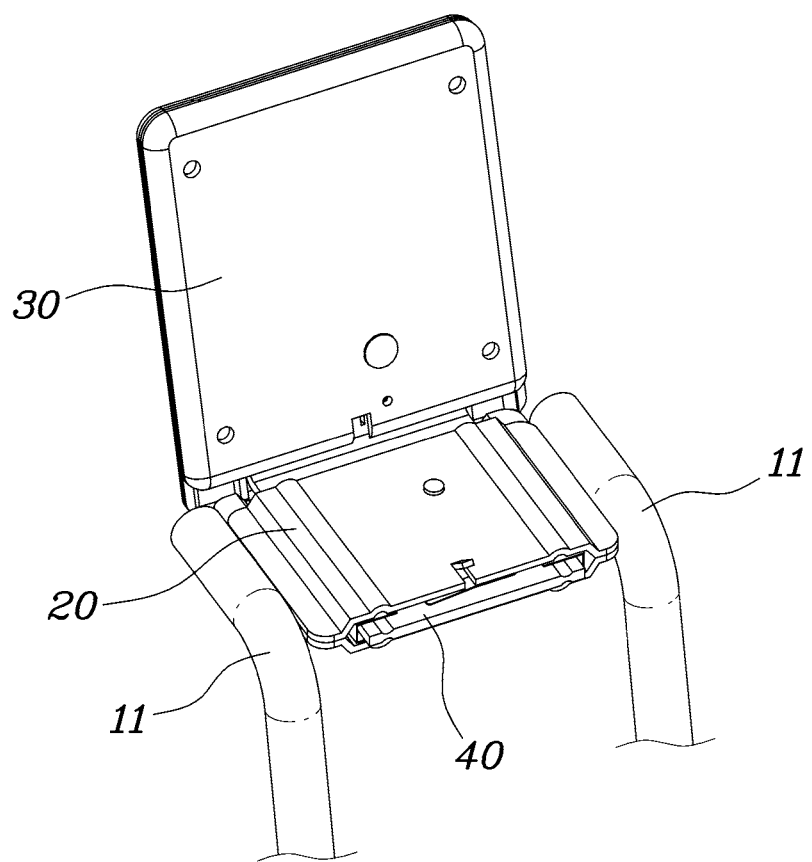
FIG. 1 is a view exemplarily illustrating the combination relation of a moving plate, a moving guide bracket, and a fixed guide bracket according to various exemplary embodiments of a headrest device of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, various exemplary embodiments of the present invention will be described in detail with reference to the accompanying drawings.

A slim headrest device of the present invention is configured by including a fixed guide bracket 20, a moving plate 40, and a moving guide bracket 30.

Figure 4:
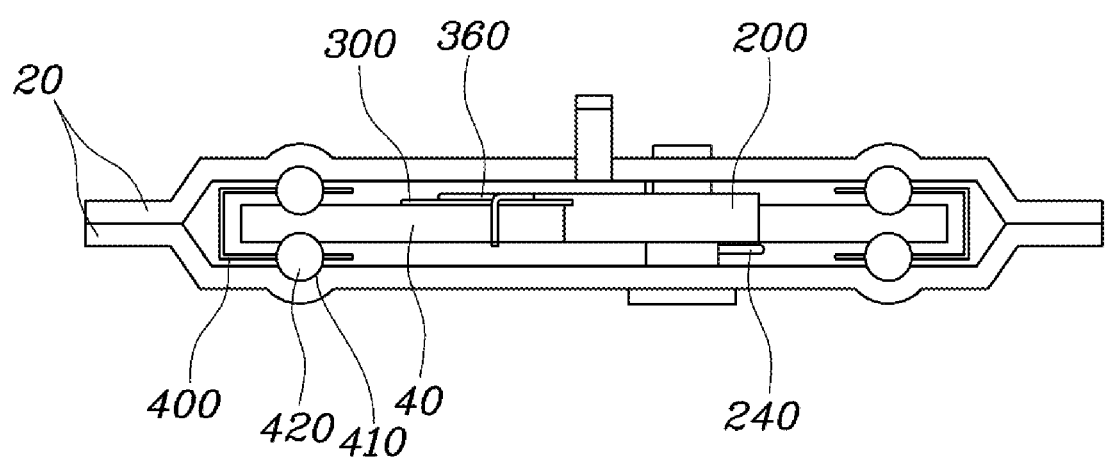
FIG. 4 is a view exemplarily illustrating a combination structure inside the fixed guide bracket according to an exemplary embodiment of the present invention.

Referring to FIGS. 1 and 4, the present invention will be described in detail. The slim headrest device includes: a fixed guide bracket 20 provided upside a seatback 10; a moving plate 40, a first end portion of which is moved forward and rearward by being guided by the fixed guide bracket 20 and a second end portion of which is in a shape bent upward; and a moving guide bracket 30 to which a headrest 60 is mounted, the moving guide bracket being moved upwardly and downwardly by being guided by the second end portion of the moving plate 40.

For example, stays 11 having a shape bent forward in a middle thereof are mounted to opposite sides of an upper portion of the seatback 10, and the fixed guide bracket 20 is combined with the stays 11 of the opposite sides therebetween. Accordingly, the fixed guide bracket 20 may be provided upside the seatback 10.

Furthermore, the fixed guide bracket 20 may be configured by an upper bracket and a lower bracket pairing to each other, and the upper bracket and the lower bracket are provided to have the shape of covering the first end portion of the moving plate 40. The moving plate 40 is configured to slide forward and rearward by being inserted into a space between the upper bracket and the lower bracket.

Furthermore, the moving guide bracket 30 may be configured to have a front bracket and a rear bracket pairing to each other, and the front bracket and the rear bracket are provided as the shape of covering the second end portion of the moving plate 40. The moving plate 40 is inserted into the moving guide bracket 30, so that the moving guide bracket 30 is configured to slide upward and downward.

Figure 15:
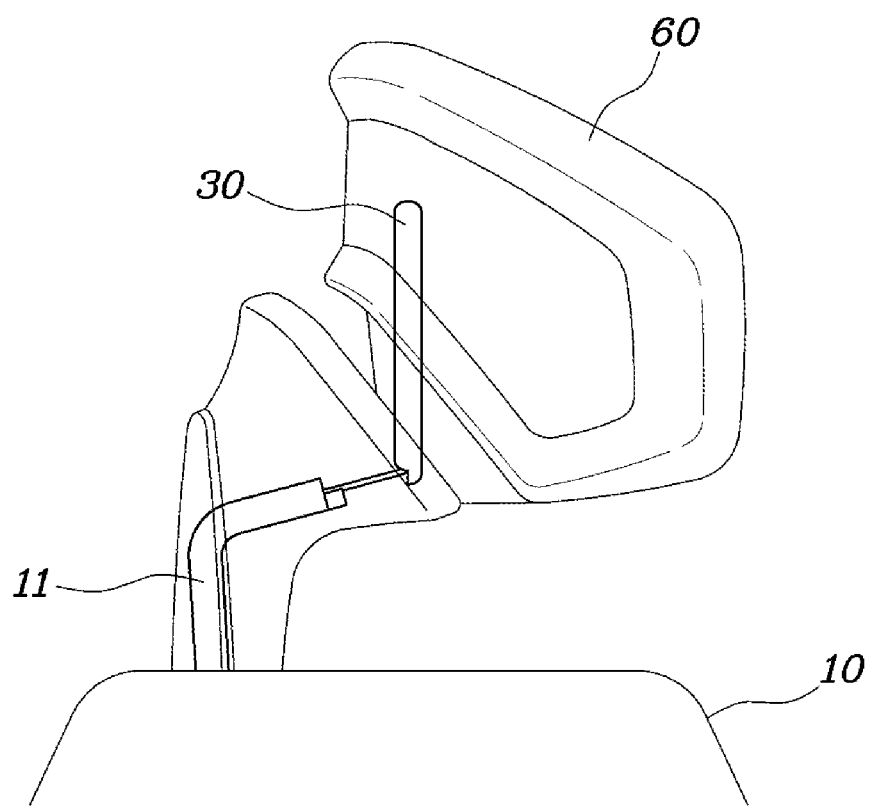
FIG. 15 and FIG. 16 are views illustrating forward and upward moving states of the headrest, respectively, which is mounted to the moving guide bracket according to an exemplary embodiment of the present invention.
Figure 16:
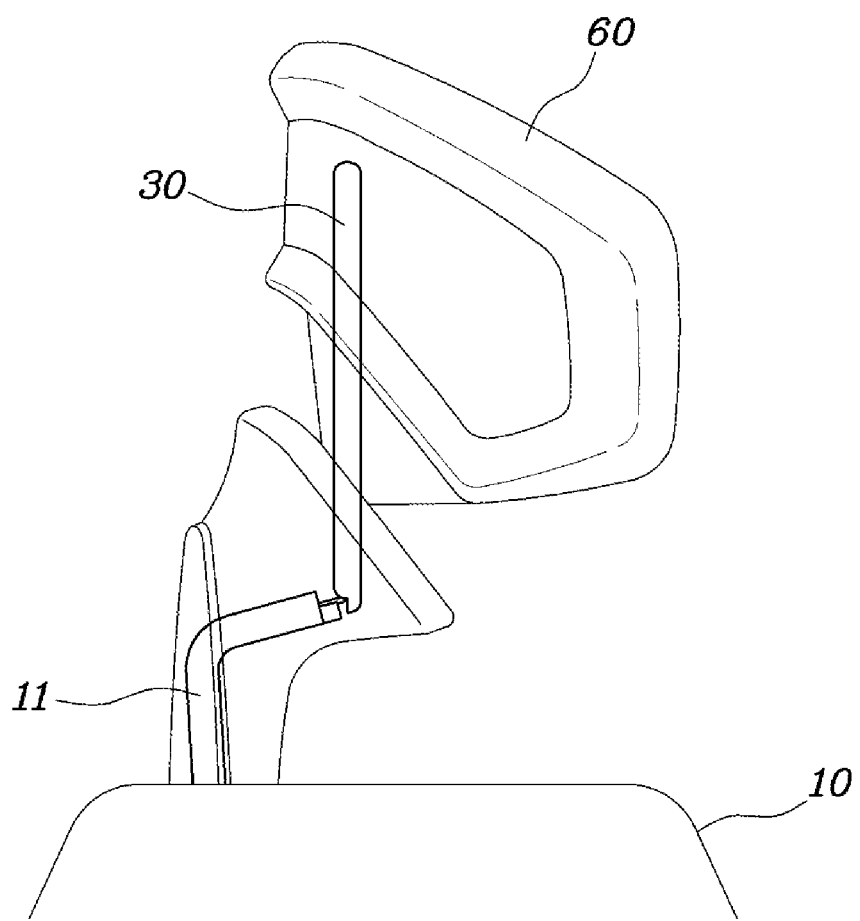

That is, according to the above-described configuration, as illustrated in FIG. 15 and FIG. 16, the moving plate 40 configured for moving forward and rearward is provided in the fixed guide bracket 20, so that the forward/rearward adjustment of the headrest 60 may be performed. Furthermore, the moving guide bracket configured for moving upward and downward is provided on the moving plate 40, so that the upward/downward adjustment of the headrest 60 may be performed.

Accordingly, the design of the headrest device is improved by compacting the forward/rearward and upward/downward adjustment mechanism of the headrest 60, so that the thickness of the headrest 60 becomes slim. Accordingly, there are advantages in terms of cost, weight, and layout due to slimming of the product.

Furthermore, to implement the forward/rearward adjustment mechanism of the headrest 60, the slim headrest device of the present invention is configured by including a first ratchet 200, a first ratchet gear 100, and a first plate spring 300.

Figure 2:
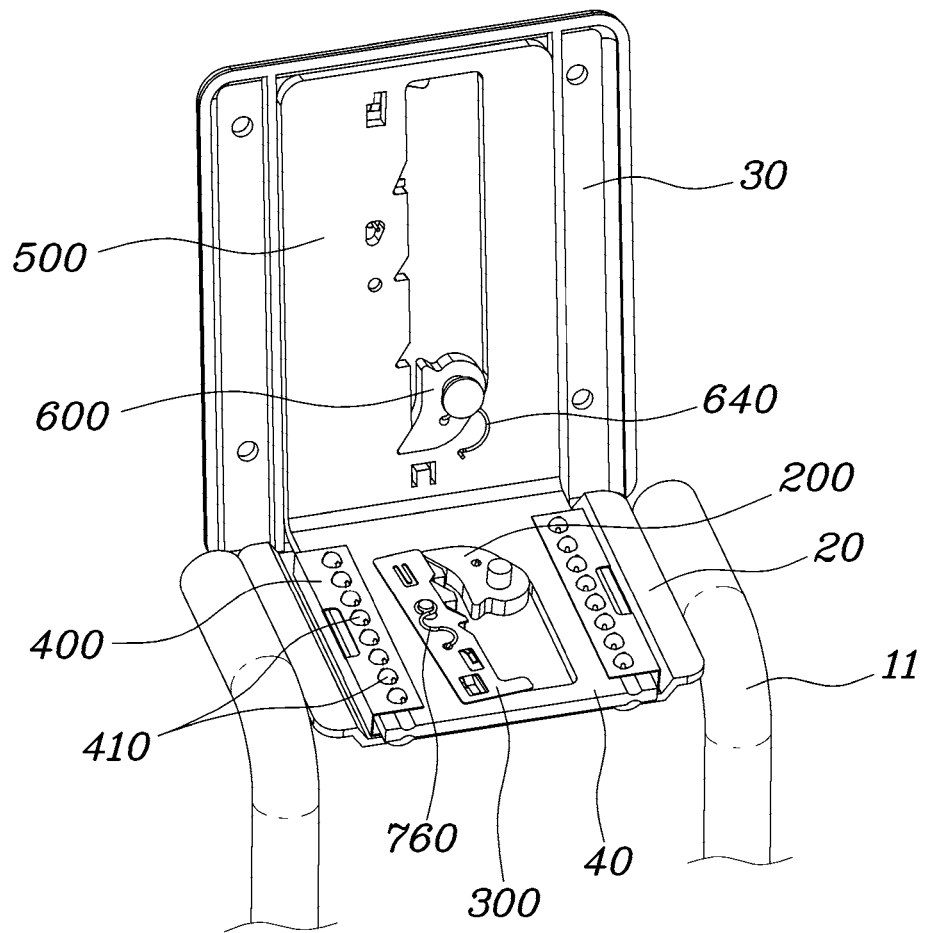
FIG. 2 is a view exemplarily illustrating the combination structure of components for forward/rearward and upward/downward adjustment operations of the headrest device according to an exemplary embodiment of the present invention.
Figure 3:
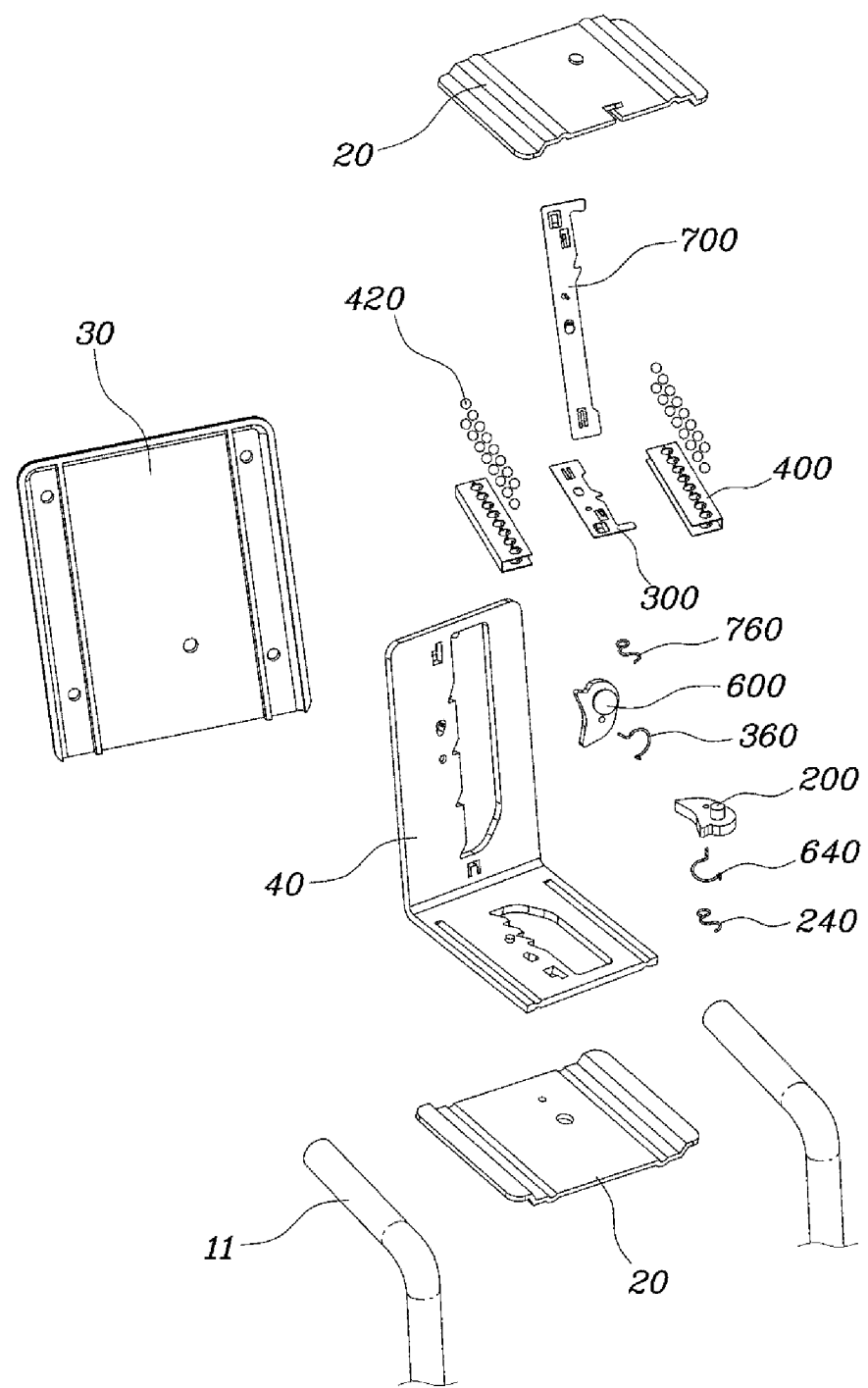
FIG. 3 is an exploded perspective view of the components applied to the headrest device according to an exemplary embodiment of the present invention.

Referring to FIG. 2 and FIG. 3, the slim headrest device is configured to include: the first ratchet 200 rotatably mounted to the fixed guide bracket 20; the first ratchet gear 100 provided in the moving plate 40, the first ratchet gear 100 defining a holding structure in cooperation with the first ratchet 200 as a shape of allowing the forward movement of the moving plate 40 and limiting the rearward movement thereof; the first plate spring 300 allowing the rearward movement of the moving plate 40 by releasing the first ratchet 200 from the first ratchet gear 100 as the first plate spring is rotated in cooperation with the first ratchet 200 by coming into contact with the first ratchet 200 at a position of maximum forward movement of the moving plate 40.

That is, when the moving plate 40 is moved forward for the forward movement of the headrest 60, the first ratchet 200 is not held in the first ratchet gear 100, so that the headrest 60 may be moved forward, whereas when the moving plate 40 is moved rearward thereof, the first ratchet 200 is held in the first ratchet gear 100, so that the headrest 60 is not moved rearward thereof.

However, the first ratchet 200 is rotated by being held in the first plate spring 300 by operation of moving the moving plate 40 forward while the headrest 60 is maximally moved forward thereof. Accordingly, the first ratchet 200 is released from the state of being held in the first ratchet gear 100, so that the headrest 60 may be moved rearward thereof.

Furthermore, referring to FIG. 2 and FIG. 3, the combination relation of components of implementing the forward/rearward adjustment mechanism will be described. An operation space portion 41 having a shape of a closed space is provided by having a middle portion of a first end portion of the moving plate 40 drilled, and the first ratchet 200 is provided in the middle portion of the operation space portion 41.

Furthermore, the first ratchet gear 100 is provided on an internal wall surface of the operation space portion 41 along a front to rear longitudinal direction thereof, and the first plate spring 300 may be provided on an upper surface of the first ratchet gear 100 therealong.

That is, the first ratchet 200 and the first ratchet gear 100 are provided in the operation space portion 41 formed in the moving plate 40, and the first plate spring 300 is provided to be adjacent to the first ratchet gear 100. Accordingly, the combination structure of the forward/rearward adjustment mechanism becomes compact, so that the device of the headrest 60 is implemented to be slim.

Meanwhile, according to an exemplary embodiment of the present invention, the forward/rearward adjustment of the headrest 60 may be operated in a plurality of levels.

To the present end, in an exemplary embodiment of the present invention, as illustrated in FIGS. 2, and 5 to 7, the first ratchet 200 has a hinge shaft 210 combined thereto in a direction orthogonal to a moving direction of the moving plate 40 to be rotated, and the first ratchet gear 100 is provided at a position opposite to the first ratchet 200 such that the first ratchet 200 is held therein, the first ratchet gear being provided in plural along the moving direction of the moving plate 40 such that the first ratchet 200 is held therein in a plurality of levels.

A holding protrusion 220 of a wedge shape is provided at a first end portion of the first ratchet 200. Furthermore, the first ratchet gear 100 has a support surface 110 provided therein in a direction orthogonal to the moving direction of the moving plate 40, wherein an inclined surface 120 is slantingly provided rearward from an internal end portion of the support surface 110 to have a tooth shape.

That is, when the headrest 60 is in a rearmost default position, the holding protrusion 220 of the first ratchet 200 is in the state of lying on the inclined surface 120 of the first ratchet gear 100, which is located at the forefront. In the instant state, when the moving plate 40 is moved forward by pulling the headrest 60 forward, the holding protrusion 220 moves over the inclined surface 120 formed at the first ratchet gear 100 of the forefront, is located at the gear groove located therebehind, and the holding protrusion 220 is held in the support surface 110 of the first ratchet gear 100 of the forefront. Accordingly, the headrest 60 may be locked at the state of being moved one level forward thereof.

By the present same principle, the headrest 60 may be locked while the headrest is moved two or three levels forward thereof. Accordingly, the forward/rearward adjustment of the headrest 60 may be performed in a plurality of levels. However, although the forward/rearward adjustment of the headrest 60 is illustrated and described to be performed upwards to three levels in an exemplary embodiment of the present invention, the number of levels for performing the forward/rearward adjustment of the headrest 60 may be changed according to the number of the first ratchet gears 100.

Furthermore, the headrest device of the present invention may include a first locking spring 240 such that operation of adjusting the headrest 60 forward and rearward in a plurality of levels is implemented more stably.

For example, the first locking spring 240 supplies an elastic force in a rotation direction of the first ratchet 200. The first locking spring 240 is configured to supply an elastic force by changing in any one rotation direction of a rotation direction of the holding protrusion 220 of the first ratchet 200 being held in the first ratchet gear 100 and a rotation direction of the holding protrusion 220 thereof being released from being held in the first ratchet gear 100 as a rotational displacement of the first ratchet 200 changes.

To the present end, a first end portion of the first locking spring 240 is supported by a movement holding hole b of a middle portion of the first ratchet 200 located at the front of the hinge shaft 210, and a second end portion of the first locking spring 240 is supported by a fixed holding hole c of the fixed guide bracket 20 located at the front of the first ratchet 200.

While the holding protrusion 220 of the first ratchet 200 is held in the first ratchet gear 100, the movement holding hole b is positioned inside a straight line toward the first ratchet gear 100 relative to the straight line connecting a center a of the hinge shaft 210 with the fixed holding hole c. However, while the holding protrusion 220 of the first ratchet 200 is released from the first ratchet gear 100, the movement holding hole b is positioned outside the straight line toward an opposite side of the first ratchet gear 100 relative to the straight line connecting the center a of the hinge shaft 210 with the fixed holding hole c.

Figure 9:
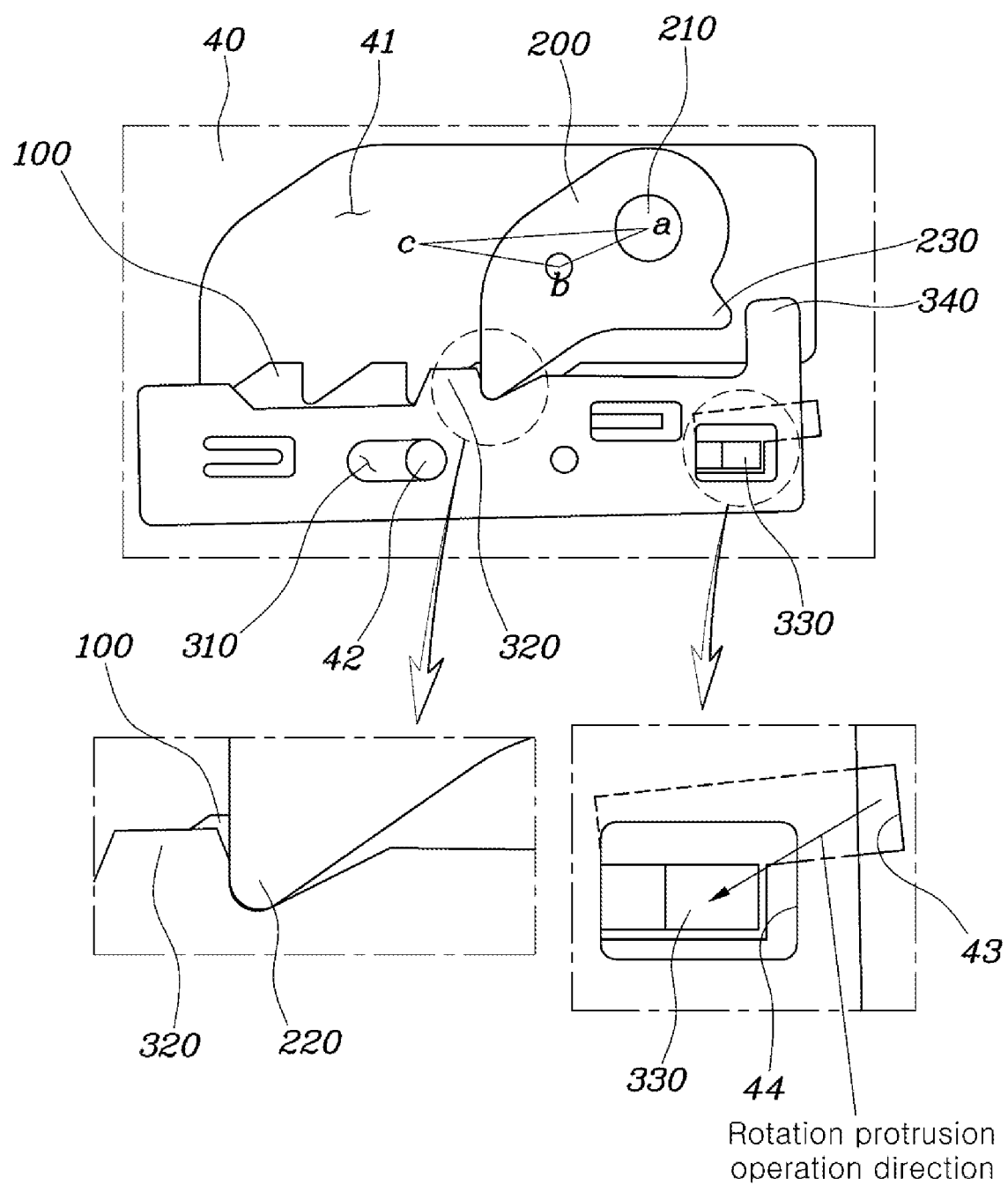
Figure 10:
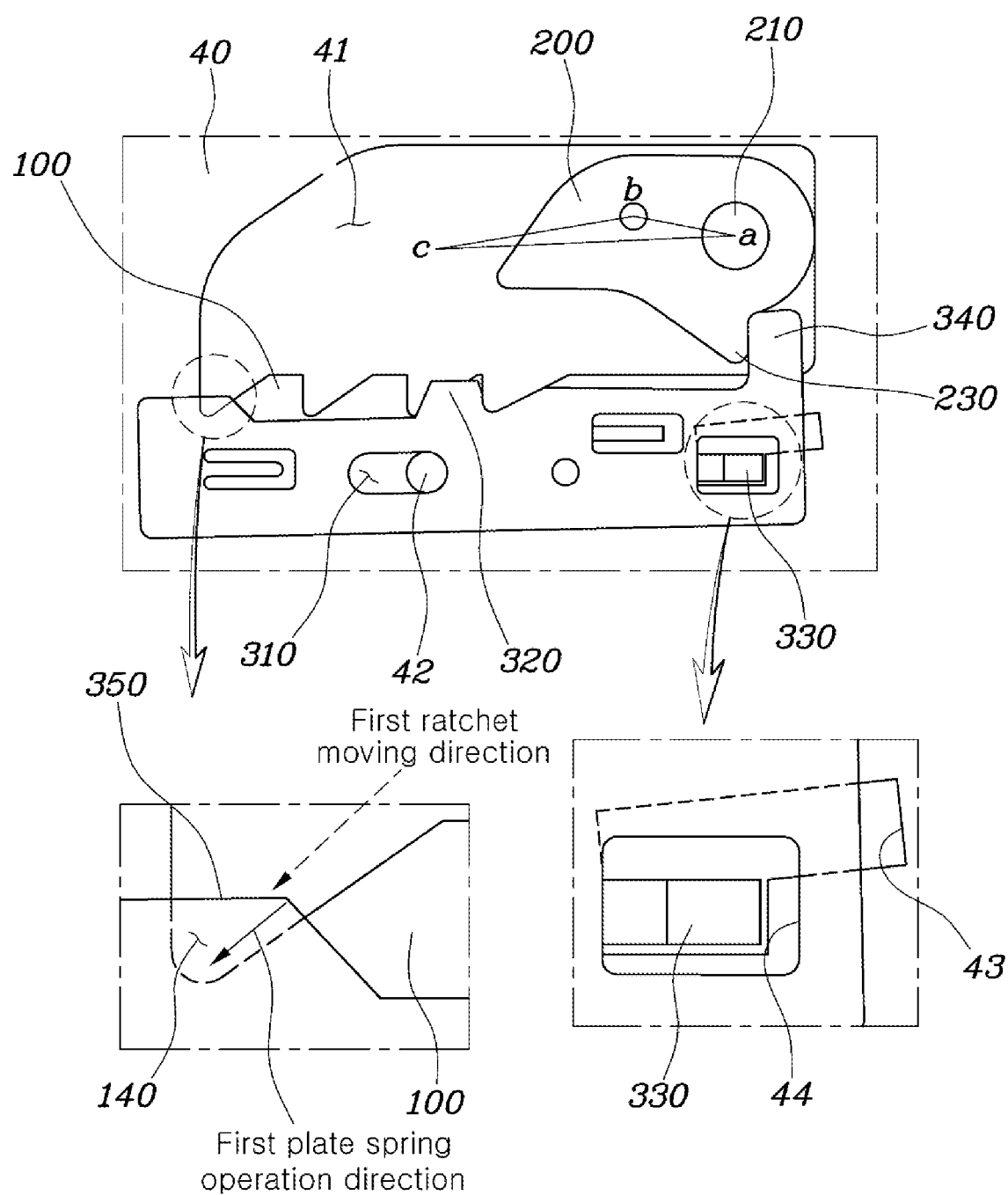
FIG. 10, FIG. 11, and FIG. 12 are views illustrating the operation processes of performing the rearward movement of the headrest according to an exemplary embodiment of the present invention.

That is, in the state of FIG. 9, the movement holding hole b is located relatively near the first ratchet gear 100 and supplies a counterclockwise elastic force to the first ratchet 200. In the state of FIG. 10, the movement holding hole b is located relatively far from the first ratchet gear 100 and supplies a clockwise elastic force to a second ratchet 600.

Accordingly, when the holding protrusion 220 of the first ratchet 200 is held in the first ratchet gear 100, the holding protrusion 220 maintains the state of being rotated toward the first ratchet gear 100 to maintain a holding state thereof, and when the holding protrusion 220 of the first ratchet 200 is released from the first ratchet gear 100, the holding protrusion 220 maintains the state of being rotated toward a direction going away from the first ratchet gear 100 to maintain a holding release state thereof.

Meanwhile, according to an exemplary embodiment of the present invention, a push protrusion 230 is provided in a second end portion of the first ratchet 200; a release protrusion 340 is provided at a second end portion of the first plate spring 300 opposite to the push protrusion 230, so that the release protrusion 340 is in contact with and is pressed by the push protrusion 230; the first plate spring 300 is rotated while being moved forward by being guided by the moving plate 40 when the release protrusion 340 is pressed by the push protrusion 230.

That is, when the forward movement of the moving plate 40 is performed maximally, the first plate spring 300 is rotated relative to a guide protrusion 42, which is described later while the release protrusion 340 is pressed by the push protrusion 230.

Accordingly, the forward movement and rotating structure of the first plate spring 300 will be described in detail referring to FIG. 8 and FIG. 9. The guide protrusion 42 is provided in the moving plate 40 by protruding therefrom toward the first plate spring 300; a guide hole 310 is provided in the first plate spring in a longitudinal direction thereof along forward/rearward moving directions thereof; and the guide protrusion 42 is inserted into the guide hole 310, so that the first plate spring 300 is moved by being guided along the guide hole 310.

That is, the guide protrusion 42 is provided in the shape of being fitted into the guide hole 310 provided in the first plate spring 300. Accordingly, the first plate spring 300 is moved by being guided by the guide protrusion 42 relative thereto.

Figure 8:
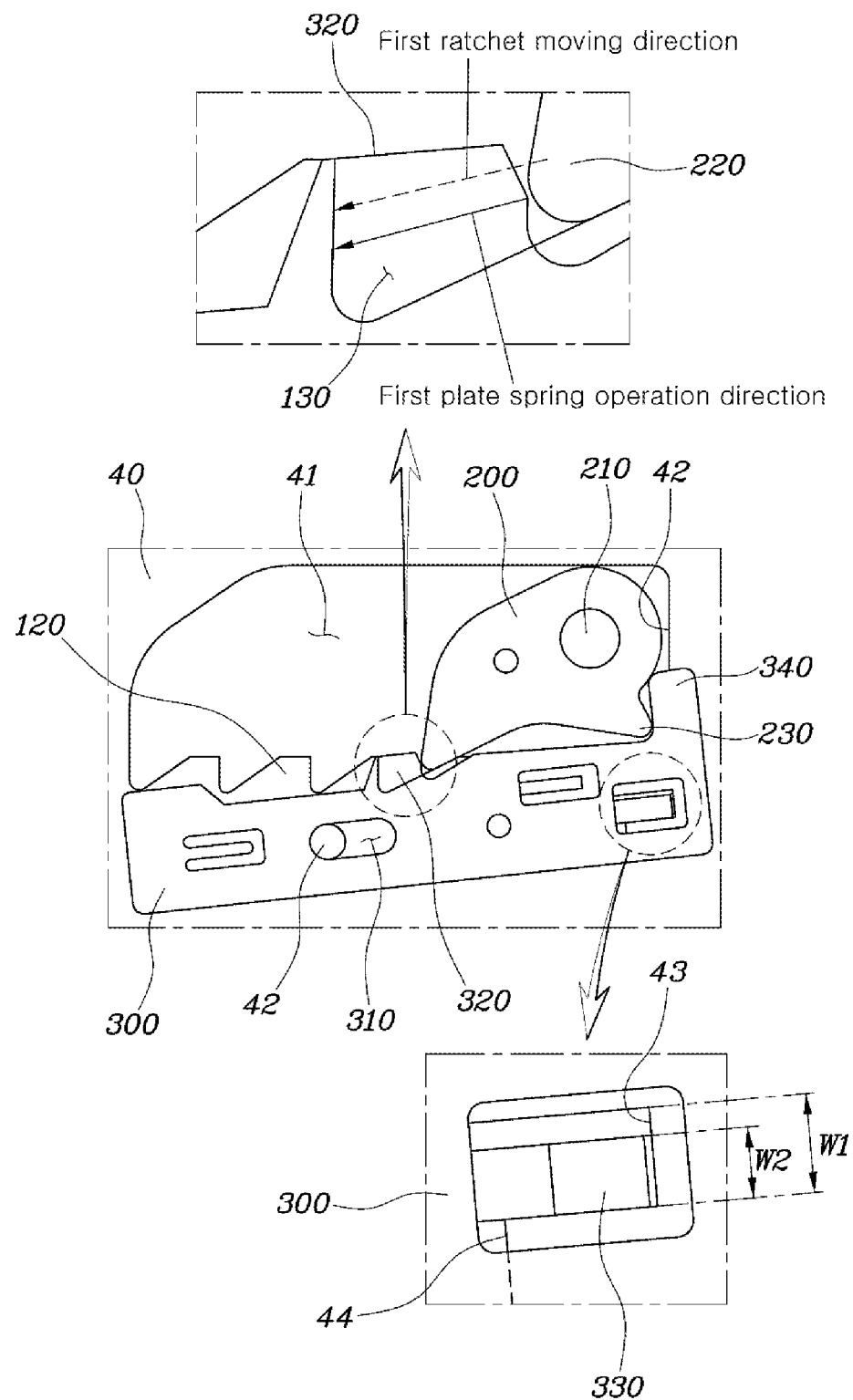

Furthermore, as illustrated in FIG. 8, a rotation protrusion 330 is provided at a second end portion of the first plate spring 300 toward the moving plate 40, the rotation protrusion 330 being provided at a second end portion of the moving plate 40 opposite to the rotation protrusion 330 by having the long groove portion 43 and a short groove portion 44 provided to be different in front to rear lengths along a rotation direction of the first plate spring 300 to have a step.

In the instant case, each of the long groove portion 43 and the short groove portion 44 is configured in a single groove shape. The long groove portion 43 is formed relatively near the operation space portion 41, and the short groove portion 44 having a shorter rear portion is formed at a side of the long groove portion 43.

Furthermore, a width w1 of the long groove portion 43 is configured to be longer than a width w2 of the rotation protrusion 330, so that the rotation protrusion 330 is rotated in a direction of the short groove portion 44 inside the long groove portion 43 relative to the guide protrusion 42 by operation of the push protrusion 230 being pressed by the release protrusion 340.

Furthermore, a locking operation protrusion 320 is provided in the middle portion of the first plate spring 300, wherein the locking operation protrusion 320 is positioned to overlap a portion of the gear groove 130 provided at a rearmost portion of the first ratchet gear 100 while the rotation protrusion 330 is rotated in the long groove portion 43 by pressing of the release protrusion 340.

Furthermore, the holding protrusion 220 provided at the first end portion of the first ratchet 200 pushes the locking operation protrusion 320 forward by being moved forward along the inclined surface 120 of the rearmost gear groove 130, so that the first plate spring 300 is moved forward thereof.

That is, the holding protrusion 220 of the first ratchet 200 pushes the locking operation protrusion 320 located inside the rearmost gear groove 130 forward along the inclined surface 120 of the gear groove 130, so that the first plate spring 300 is moved forward together with the locking operation protrusion 320 along the inclined surface 120.

Accordingly, as illustrated in FIG. 8 and FIG. 9, in the process in which the first plate spring 300 is moved to the front portion of the moving plate from the rear portion thereof, the rotation protrusion 330 is moved into the short groove portion 44 from the long groove portion 43 while the first plate spring 300 is rotated relative to the guide protrusion 42.

Furthermore, in the process in which the first plate spring 300 is moved to the rear portion of the moving plate from the front portion thereof, the rotation protrusion 330 is moved into the long groove portion 43 from the short groove portion 44 while the first plate spring 300 is rotated relative to the guide protrusion 42.

That is, when the first plate spring 300 is moved forward by pressing the locking operation protrusion 320 forward by use of the holding protrusion 220, the rotation protrusion 330 located at the long groove portion 43 is moved forward thereof. In the moment when the rotation protrusion 330 is removed from the long groove portion 43 as the forward movement amount of the first plate spring 300 increases, the rotation protrusion 330 is moved into the short groove portion 44 while the first plate spring 300 is rotated relative to the guide protrusion 42.

Meanwhile, as illustrated in FIG. 10, according to an exemplary embodiment of the present invention, as the push protrusion 230 is pressed by the release protrusion 340 with the rotation protrusion 330 positioned inside the short groove portion 44, the first ratchet 200 is configured to be rotated and be released from the first ratchet gear 100.

That is, when the first plate spring 300 is moved forward, the rotation protrusion 330 is located in the short groove portion 44 and the release protrusion 340 is located to oppose the push protrusion 230.

Accordingly, the first ratchet 200 is rotated by the release protrusion 340 being in contact with and pressed by the push protrusion 230 when the moving plate 40 is moved forward, and the holding protrusion 220 of the first ratchet 200 is released from the state of being held in the rearmost gear groove 130 of the first ratchet gear 100 by the rotation.

Figure 11:
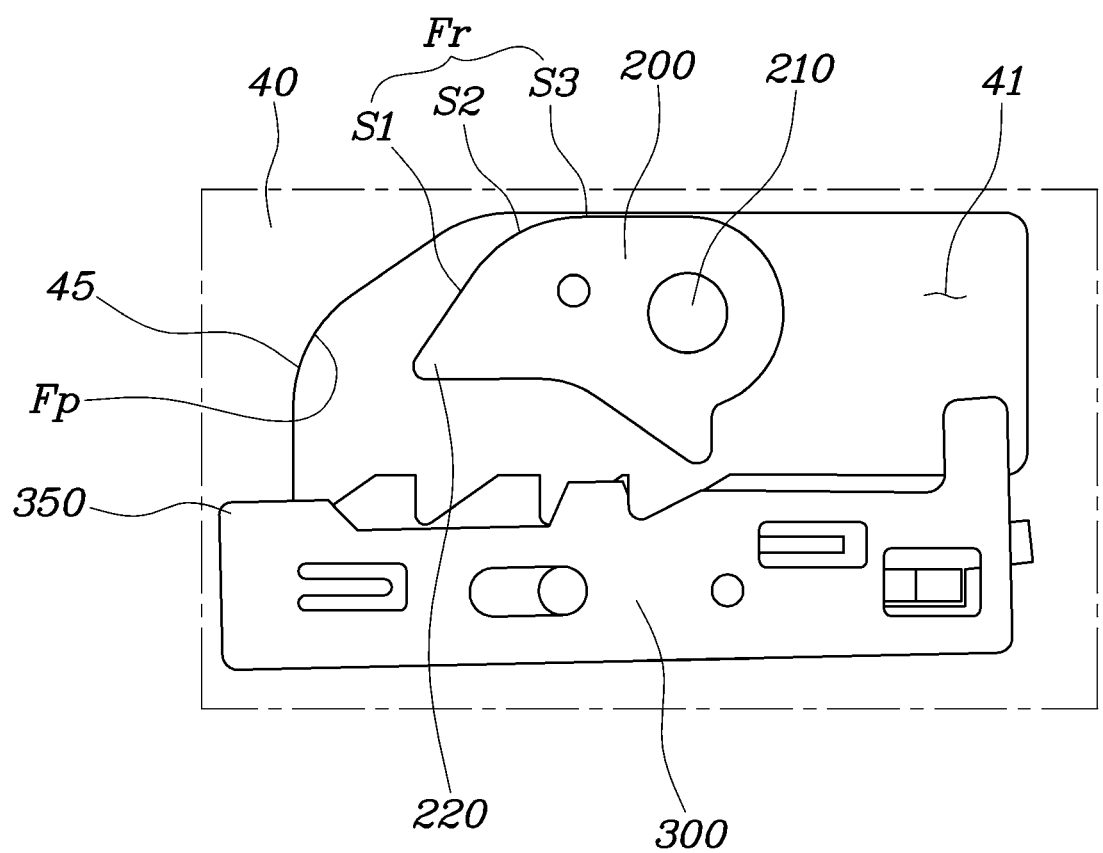
Figure 12:
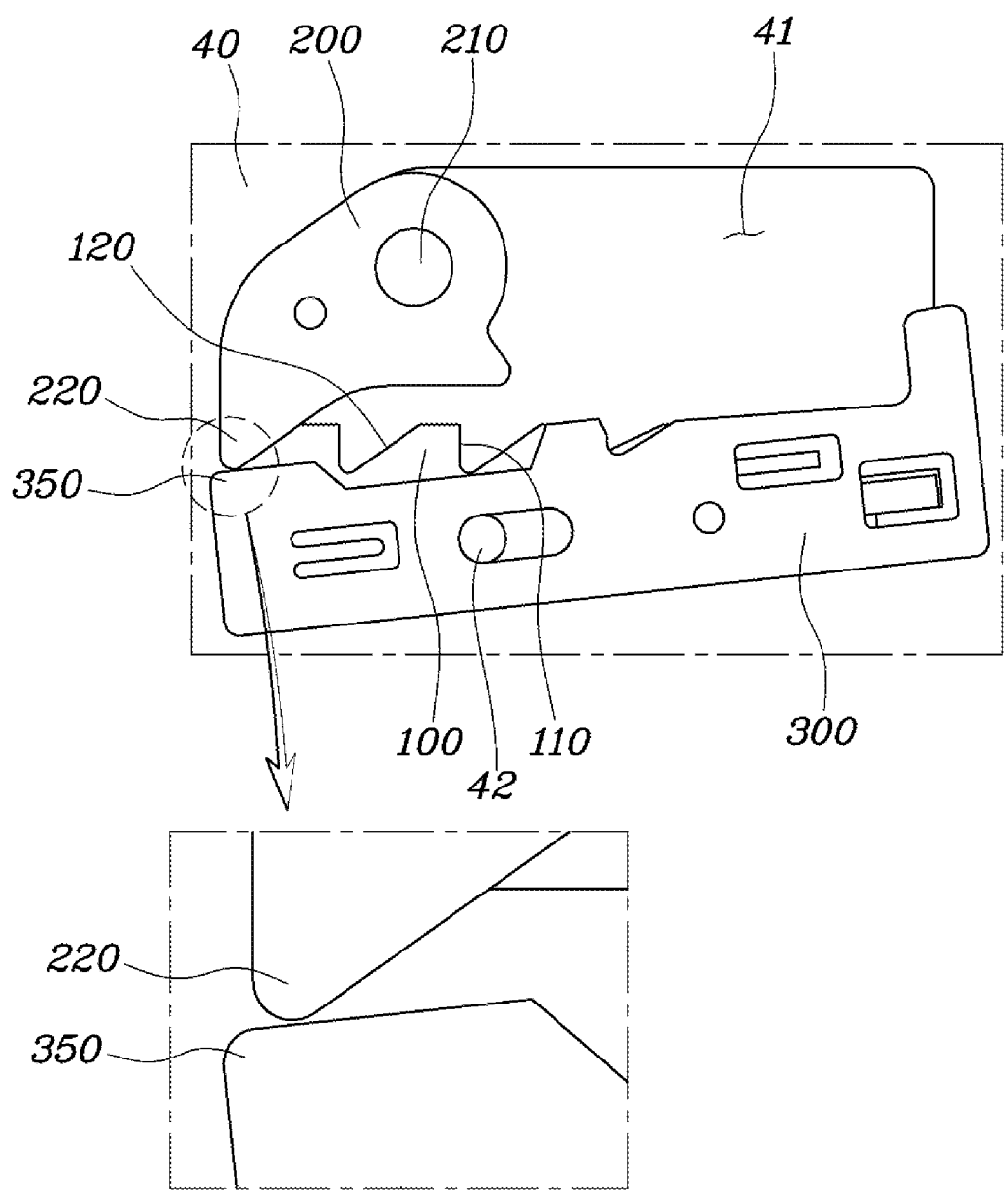

Furthermore, referring to FIG. 11 and FIG. 12, a release press portion 45 is provided in a front of the moving plate 40 opposite to a first end portion of the first ratchet 200, so that the release press portion 45 contacts with and is pressed by the first end portion of the first ratchet 200; and the first ratchet 200 is rotated and held in the first ratchet gear 100 as the release press portion 45 is pressed by the first end portion of the first ratchet 200.

A ratchet guide surface Fr is provided on an external surface of the first ratchet 200 continuous to the second end portion thereof from the first end portion thereof, wherein a first section S1 having the holding protrusion 220 of the first ratchet 200 of the ratchet guide surface Fr is configured as a flat surface, a second section S2 continuing to the first section S1 is configured as a convex surface, and a third section S3 continuing to the second section S2 is configured as a flat surface.

Furthermore, a plate guide surface Fp of a shape corresponding to the ratchet guide surface Fr is provided on an internal surface of the release press portion 45 opposite to the ratchet guide surface Fr, so that the rotation of the first ratchet 200 is guided while the ratchet guide surface Fr is in contact with the plate guide surface Fp.

That is, when the moving plate 40 is moved rearward while the first ratchet 200 is released from the first ratchet gear 100 located at the rearmost position, the release press portion 45 contacts with and is pressed by the first end portion of the first ratchet 200.

Accordingly, due to the shapes of the plate guide surface Fp and the ratchet guide surface Fr, the ratchet guide surface Fr is rotated while sliding along the plate guide surface Fp provided in the internal surface of the release press portion 45. Accordingly, the holding protrusion 220 of the first ratchet 200 is held in a forefront gear groove 140 of the first ratchet gear 100.

Furthermore, a release operation protrusion 350 is provided in a first end portion of the first plate spring 300, wherein the release operation protrusion 350 is located to overlap a portion of the gear groove 140 provided at a front of the first ratchet gear 100 when the release press portion 45 is located at a position of being pressed by the first end portion of the first ratchet 200.

Accordingly, a holding protrusion 220 provided at the first end portion of the first ratchet 200 presses the release operation protrusion 350 located inside the gear groove as the release press portion 45 presses the first end portion of the first ratchet 200, so that the first plate spring 300 is moved rearward while being rotated to a locking operation position relative to a guide protrusion 42. Here, in the locking operation position, the first plate spring 300 is rotated while being moved rearward thereof, so that the rotation protrusion 330 is positioned in the long groove portion 43.

That is, the holding protrusion 220 of the first ratchet 200 pushes the release operation protrusion 350 located inside the forefront gear groove 140 to a side, so that the first plate spring 300 is rotated with the release operation protrusion 350 relative to the guide protrusion 42.

Accordingly, the rotation protrusion 330 located in the short groove portion 44 is rotated in the direction of the long groove portion 43 while being removed from the short groove portion 44 and is moved into the long groove portion 43 by a force of moving the first plate spring 300 rearward thereof, so that the first plate spring 300 may be moved rearward thereof.

Furthermore, the headrest device of the present invention may include a first return spring 360 supplying an elastic force in the rearward moving direction of the first plate spring 300.

That is, when the first plate spring 300 is rotated by the holding protrusion 220 of the first ratchet 200 pushing the release operation protrusion 350 located inside the forefront gear groove 140 to a side, the first plate spring 300 may be moved rearward by the elastic force of the first return spring 360.

Accordingly, in an exemplary embodiment of the present invention, the first ratchet 200 is configured to be held in or be released from the first ratchet gear 100 while the first ratchet 200 is rotated in cooperation with the first plate spring 300. Accordingly, a mechanism for the forward/rearward adjustment operation of the headrest 60 becomes compact, so that the device of the headrest 60 may be implemented to be slim.

In an exemplary embodiment of the present invention, unlike a conventional headrest, even when the headrest 60 is forcibly pushed during the movement of the headrest 60 to the forefront, the first ratchet 200 is not released from the first ratchet gear 100 by rotational inertia, but is held in the first ratchet gear located at the forefront, so operability by the forward/rearward adjustments of the headrest 60 is improved.

Meanwhile, in an exemplary embodiment of the present invention, a bearing structure may be provided between the fixed guide bracket 20 and the moving plate 40 to slide the moving plate 40 forward and rearward thereof.

The bearing structure includes: a ball case 400 formed in a shape of covering a side edge portion of the moving plate 40 and having a ball hole 410 provided in a longitudinal direction thereof; and a ball 420 fitted into the ball hole 410, a spheric surface of the ball of a side relative to the ball hole 410 being roll-supported by the moving plate 40 and a spheric surface of the ball of an opposite side of the side being roll-supported by an internal surface of the fixed guide bracket 20.

That is, the forward and rearward movements of the moving plate 40 are supported by the ball bearing structure, so a uniform operating force is achieved regardless of surrounding environmental conditions. Accordingly, an operating force is improved and operating noise is reduced.

Meanwhile, to implement the upward/downward adjustment mechanism of the headrest 60, the headrest device of the present invention is configured by including the second ratchet 600, a second ratchet gear 500, and a second plate spring 700.

Figure 13:
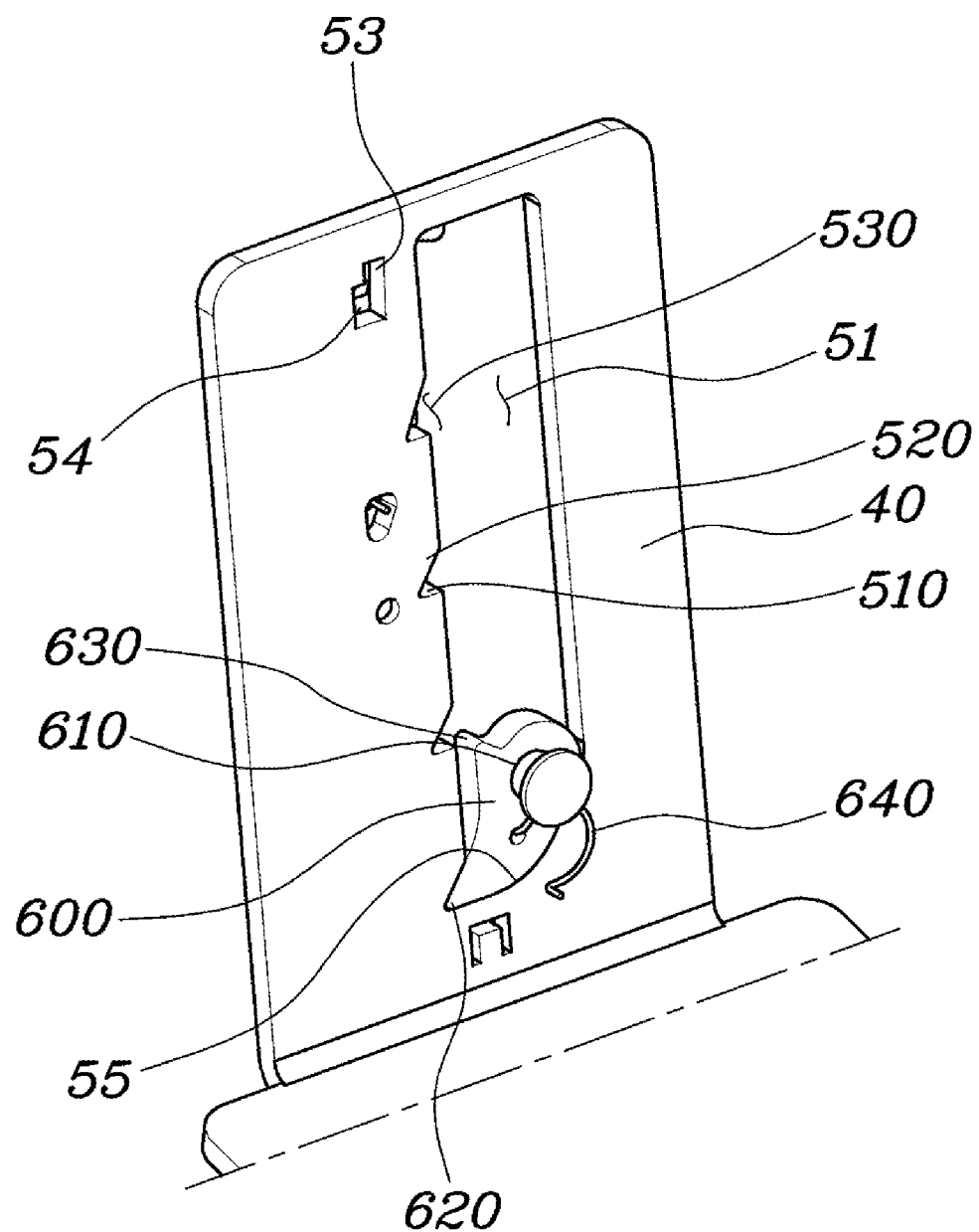
FIG. 13 and FIG. 14 are views illustrating the combination structure of the components for the upward/downward adjustment operations of the headrest device according to an exemplary embodiment of the present invention.
Figure 14:
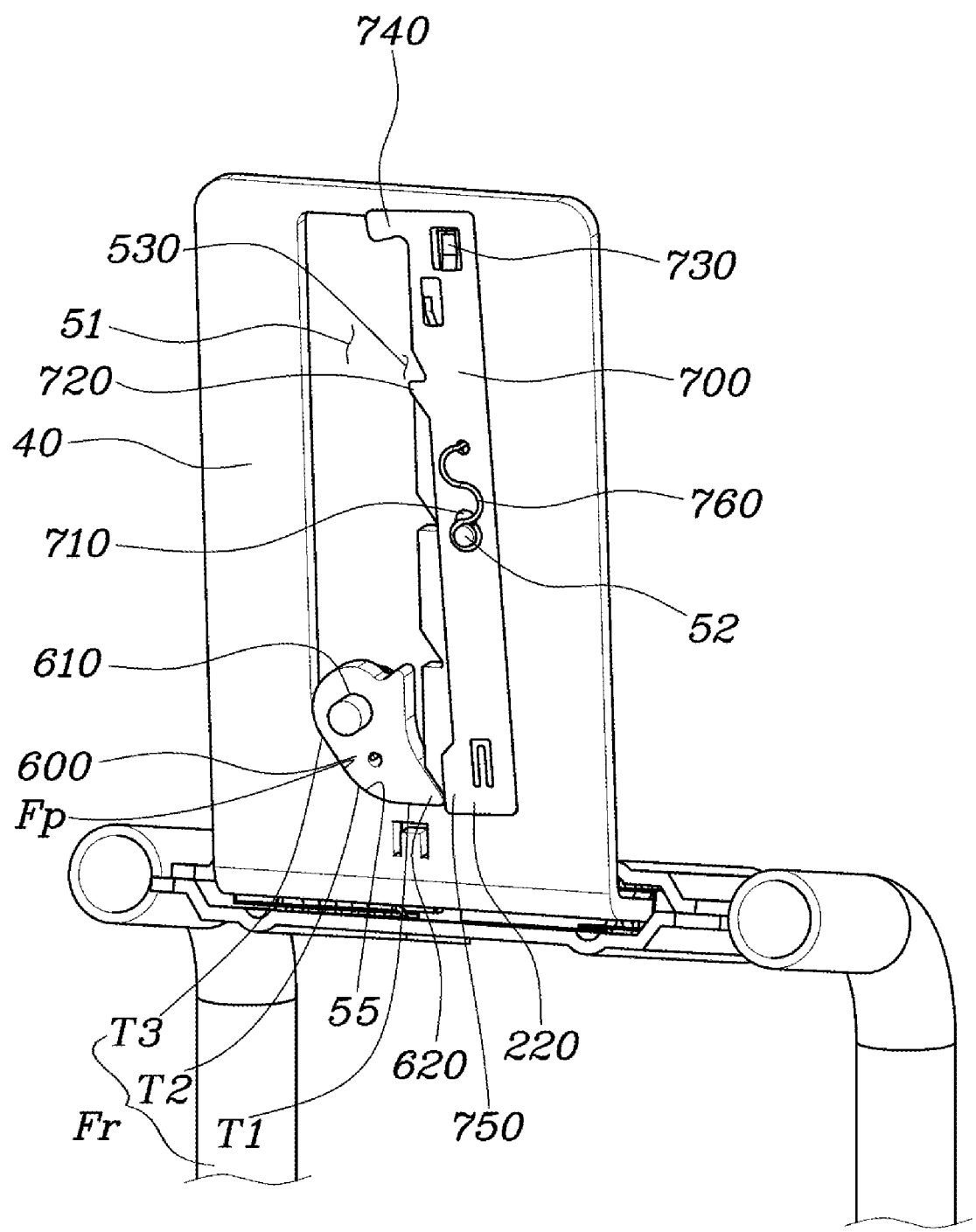

Referring to FIGS. 13 and 14, the headrest device includes: the second ratchet 600 rotatably mounted to the moving guide bracket 30; a second ratchet gear 500 provided in the moving plate 40, the second ratchet gear defining a holding structure in cooperation with the second ratchet 600 as a shape of allowing an upward movement of the moving guide bracket 30 and limiting a downward movement thereof; and a second plate spring 700 allowing a downward movement of the moving guide bracket 30 by releasing the second ratchet 600 from the second ratchet gear 500 by rotating in cooperation with the second ratchet 600 by coming into contact with the second ratchet 600 at a position of maximum upward movement of the moving guide bracket 30.

That is, when the moving guide bracket 30 is moved upward for the upward movement of the headrest 60, the second ratchet 600 is not held in the second ratchet gear 500, so that the headrest 60 may be moved upward, whereas when the moving guide bracket 30 is moved downward, the second ratchet 600 is held in the second ratchet gear 500, so that the headrest 60 is not moved downward.

However, the second ratchet 600 is rotated by being held in the second plate spring 700 by the operation of moving the moving guide bracket 30 upward while the headrest 60 is maximally moved upwards. Accordingly, the second ratchet 600 is released from the state of being held in the second ratchet gear 500, so that the headrest 60 may be moved downward.

The upward/downward adjustment mechanism of the headrest 60 is implemented in the same structure and operation method as the above-described forward/rearward adjustment mechanism, and overlapping operation descriptions will be omitted.

Accordingly, the combination relation of the components applied to the upward/downward adjustment mechanism of the present invention will be described below. An operation space portion 51 is provided to have a closed space by having a middle portion of the second end portion of the moving plate 40 drilled and the second ratchet 600 is provided in a middle portion of the operation space portion 51.

Furthermore, the second ratchet gear 500 is provided on an internal wall surface of the operation space portion 51, and the second plate spring 700 may be provided on an upper surface of the second ratchet gear 500 therealong.

That is, the second ratchet 600 and the second ratchet gear 500 are provided in the operation space portion 51 formed in the moving plate 40, and the second plate spring 700 is provided to be adjacent to the second ratchet gear 500. Accordingly, the combination structure of the upward/downward adjustment mechanism becomes compact, so that the headrest device is implemented to be slim.

Meanwhile, according to an exemplary embodiment of the present invention, the upward/downward adjustment of the headrest 60 may be operated in a plurality of levels.

To this end, as illustrated in FIGS. 13 and 14, in an exemplary embodiment of the present invention, the second ratchet 600 has the hinge shaft 610 combined thereto in a direction orthogonal to a moving direction of the moving guide bracket 30 to be rotated, and the second ratchet gear 500 is provided at a position opposite to the second ratchet 600 such that the second ratchet 600 is held therein and may be provided in plural along the moving direction of the moving guide bracket 30 such that the second ratchet 600 is held therein in a plurality of levels.

A holding protrusion 620 of a wedge shape is provided at a first end portion of the second ratchet 600, and the second ratchet gear 500 has a support surface 510 provided therein in a direction orthogonal to the moving direction of the moving guide bracket 30, wherein an inclined surface 520 is slantingly provided upwards from an internal end portion of the support surface 510 to have a tooth shape.

Furthermore, the headrest device of the present invention may include a second locking spring 640 such that the operation of adjusting the headrest 60 upwardly and downwardly in a plurality of levels is further stably implemented.

For example, the second locking spring 640 supplies an elastic force in a rotation direction of the second ratchet 600. The second locking spring 640 is configured to supply an elastic force by changing in any one rotation direction of a rotation direction of the holding protrusion 620 of the second ratchet 600 being held in the second ratchet gear 500 and a rotation direction of the holding protrusion 620 thereof being released from being held in the second ratchet gear 500 as a rotational displacement of the second ratchet 600 changes.

Meanwhile, according to an exemplary embodiment of the present invention, a push protrusion 630 is provided at a second end portion of the second ratchet 600; a release protrusion 740 is provided at a second end portion of a second plate spring 700 opposite to the push protrusion 630, so that the release protrusion 740 is in contact with and pressed by the push protrusion 630; and the second plate spring 700 is rotated while being moved downwards by being guided by the moving plate 40 when the release protrusion 740 is pressed by the push protrusion 630.

Accordingly, the upward movement and rotating structure of the second plate spring 700 will be described in detail. A guide protrusion 52 is provided in the moving plate 40 by protruding therefrom toward the second plate spring 700; a guide hole 710 is provided in the second plate spring 700 in a longitudinal direction thereof along upward/downward moving directions thereof; and the guide protrusion 52 is inserted into the guide hole 710, so that the second plate spring 700 is moved by being guided along the guide hole 710.

Furthermore, a rotation protrusion 730 is provided at the second end portion of the second plate spring 700 toward the moving plate 40, wherein the rotation protrusion 730 is provided at an upper end portion of the moving plate 40 opposite to the rotation protrusion 730 by having the long groove portion 53 and a short groove portion 54 provided to be different in vertical lengths along a rotation direction of the first plate spring 300 to have a step.

Furthermore, a width of the long groove portion 53 is configured to be longer than a width of the rotation protrusion 730, so that the rotation protrusion 730 is rotated in a direction of the short groove portion 54 inside the long groove portion 53 relative to the guide protrusion 52 by operation of the push protrusion 630 being pressed by the release protrusion 740.

Furthermore, a locking operation protrusion 720 is provided in a middle portion of second plate spring 700, wherein the locking operation protrusion 720 is positioned to overlap a portion of a gear groove 530 provided at an uppermost portion of the second ratchet gear 500 while the rotation protrusion 730 is rotated in the long groove portion 53 by pressing of the release protrusion 740.

Furthermore, the holding protrusion 620 provided at the first end portion of the second ratchet 600 pushes the locking operation protrusion 720 downward by being moved downwards along the inclined surface 520 of the uppermost gear groove 530, so that the second plate spring 700 is moved downward.

In the process in which the second plate spring 700 is moved to the lower portion of the moving plate 40 from the upper portion thereof, the rotation protrusion 730 is moved into the short groove portion 54 from the long groove portion 53 while the second plate spring 700 is rotated relative to the guide protrusion 52.

Additionally, in the process in which the second plate spring 700 is moved to the upper portion from the lower portion, the rotation protrusion 730 is moved into the long groove portion 53 from the short groove portion 54 while the second plate spring 700 is rotated relative to the guide protrusion 52.

Meanwhile, according to an exemplary embodiment of the present invention, as the push protrusion 630 is pressed by the release protrusion 740 with the rotation protrusion 730 positioned inside the short groove portion 54, the second ratchet 600 is configured to be rotated and be released from the second ratchet gear 500.

Furthermore, a release press portion 55 is provided in the lower portion of the moving plate 40 opposite to the first end portion of the second ratchet 600, so that the first end portion of the second ratchet 600 contacts with and is pressed by the release press portion 55; and the second ratchet 600 is rotated and held in the second ratchet gear 500 as the first end portion of the second ratchet 600 is pressed by the release press portion 55.

The ratchet guide surface Fr is provided on an external surface of the second ratchet 600 continuing to the second end portion thereof from the first end portion thereof; a first section T1 having the holding protrusion 620 of the second ratchet 600 of the ratchet guide surface Fr is configured as a flat surface, a second section T2 continuing to the first section T1 is configured as a convex surface, a third section T3 continuing to the second section T2 is configured as a flat surface.

Furthermore, the plate guide surface Fp of a shape corresponding to the ratchet guide surface Fr is provided at a portion of the moving plate 43 opposite to the ratchet guide surface Fr. Accordingly, the rotation of the second ratchet 600 is guided while the ratchet guide surface Fr contacts with the plate guide surface Fp.

Furthermore, a release operation protrusion 750 is provided in a first end portion of the second plate spring 700, wherein the release operation protrusion 750 is located to overlap a portion of a gear groove 540 provided in a lower portion of the second ratchet gear 500 when the first end portion of the second ratchet 600 is located at a position of being pressed by the release press portion 55.

Accordingly, the holding protrusion 620 provided at the first end portion of the second ratchet 600 presses the release operation protrusion 750 located inside the gear groove as the first end portion of the second ratchet 600 presses the release press portion 55, so that the second plate spring 700 is moved upward while being rotated to a locking operation position relative to the guide protrusion 52. Here, in the locking operation position, the second plate spring 700 is rotated while being moved upward, so that the rotation protrusion 730 is positioned in the long groove portion 53.

Furthermore, the headrest device of the present invention may include a second return spring 760 supplying an elastic force in an upward moving direction of the second plate spring 700.

Figure 5:
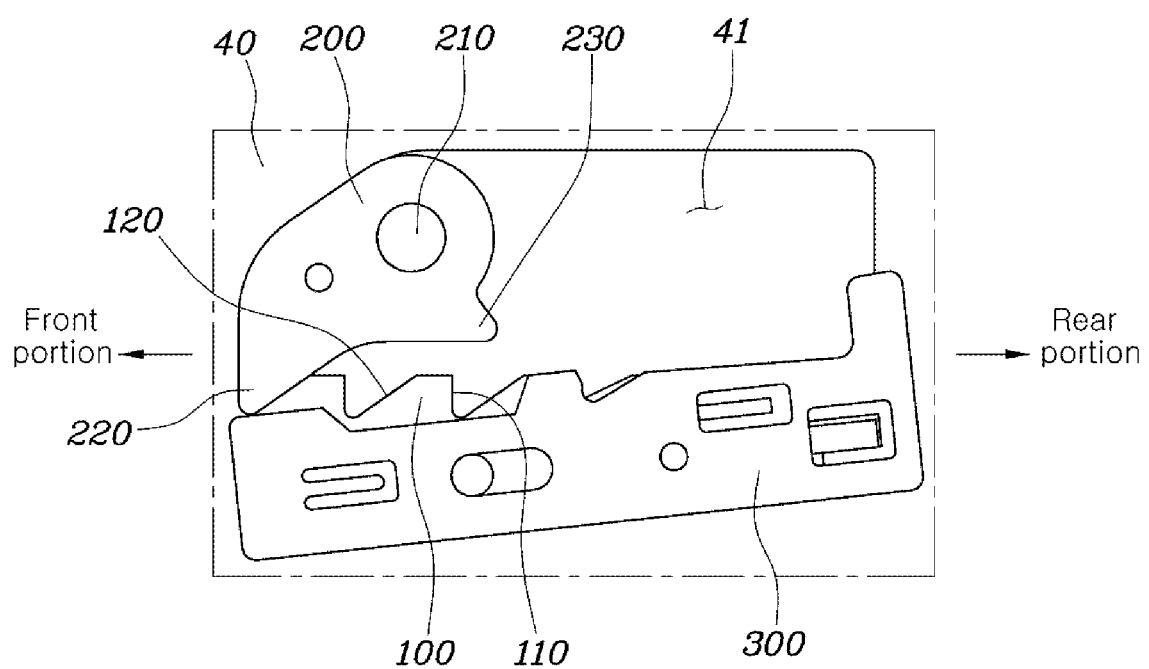
FIG. 5, FIG. 6, FIG. 7, FIG. 8, and FIG. 9 are views illustrating the operation processes of performing the forward movement of the headrest according to an exemplary embodiment of the present invention.

Meanwhile, the operation of moving the headrest 60 in an exemplary embodiment of the present invention forward will be described. In FIG. 5, the headrest 60 is located at the rearmost position. In the instant state, when the headrest 60 is moved forward, the moving plate 40 is moved forward together with the headrest 60.

Accordingly, the holding protrusion 220 of the first ratchet slides over the inclined surface 120 of the first ratchet gear 100 of the forefront. Accordingly, the holding protrusion 220 is held in the gear groove behind the forefront first ratchet gear 100, and the headrest 60 is locked at a position of a first forward level as illustrated in FIG. 6.

Figure 6:
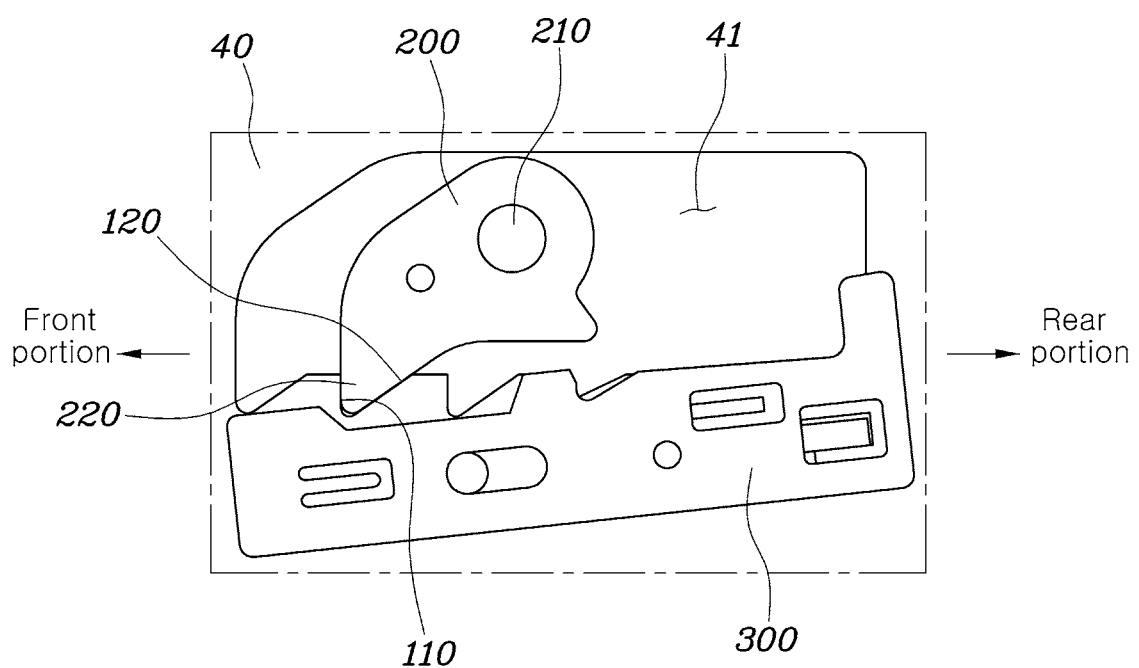

Next, in the state of FIG. 6, when the headrest 60 is moved forward again, the holding protrusion 220 slides over an inclined surface 120 of the first ratchet gear 100 therebehind. Accordingly, the holding protrusion 220 is held in a gear groove behind the inclined surface 120, and the headrest 60 is locked at a position of a second forward level as illustrated in FIG. 7.

Figure 7:
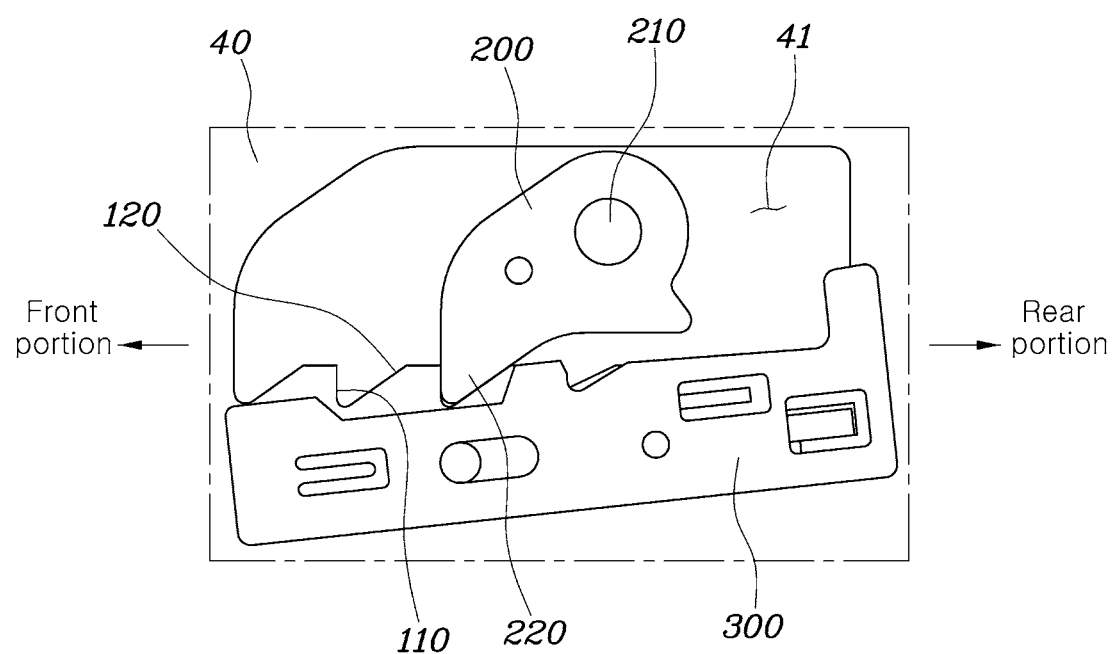

Next, in the state of FIG. 7, when the headrest 60 is moved forward again, the holding protrusion 220 slides over the inclined surface 120 of the first ratchet gear 100 therebehind.

In the instant case, as illustrated in FIG. 8, when the moving plate 40 is maximally moved forward, the push protrusion 230 formed in the first ratchet 200 is pressed by the release protrusion 340 formed in the first plate spring 300, and the rotation protrusion 330 formed in the first plate spring 300 is rotated clockwise inside the long groove portion 43 relative to the guide protrusion 42.

Accordingly, as soon as the first plate spring 300 is rotated clockwise, the holding protrusion 220 of the first ratchet 200 is moved to the position of the rearmost gear groove 130. The locking operation protrusion 320 is located at the rearmost gear groove 130, so that the holding protrusion 220 pushes the locking operation protrusion 320 forward while moving along the inclined surface 120 of the rearmost gear groove 130.

Accordingly, as the rotation protrusion 330 is moved forward therewith, the rotation protrusion 330 is moved into the short groove portion 44 from the long groove portion 43. In the process in which the rotation protrusion 330 is moved into the short groove portion 44 from the long groove portion 43, the first plate spring 300 is moved forward while being rotated relative to the guide protrusion 42, so that the headrest 60 is locked at the forefront as illustrated in FIG. 9.

Accordingly, according to an exemplary embodiment of the present invention, unlike the conventional headrest, even when the headrest 60 is forcibly pushed during the movement of the headrest 60 to the forefront, the first ratchet 200 is not released from the first ratchet gear 100 by rotational inertia, but is held in the first ratchet gear 100 located at the forefront, so operability by the forward/rearward adjustments of the headrest 60 is improved.

Furthermore, the operation of moving the headrest 60 rearward will be described. In the state of FIG. 9, when the headrest 60 is moved forward, the release protrusion 340 pushes the push protrusion 230, and the holding protrusion 220 is released from being held in the first ratchet gear 100 while the first ratchet 200 is rotated clockwise as illustrated in FIG. 10.

Accordingly, as illustrated in FIG. 11, the moving plate 40 and the first plate spring 300 are moved rearward together.

Accordingly, as illustrated in FIG. 12, the first ratchet 200 is rotated counterclockwise while the ratchet guide surface Fr of the first ratchet 200 contacts with and is guided by the plate guide surface Fp, and the holding protrusion 220 is held in the forefront gear groove 140.

In the instant case, as illustrated in FIG. 10, the release operation protrusion 350 is located at the forefront gear groove 140, so that the holding protrusion 220 pushes the release operation protrusion 350 to a side thereof.

Accordingly, the first plate spring 300 is moved rearward while being rotated relative to the guide protrusion 42. Accordingly, the rotation protrusion 330 located at the short groove portion 44 is moved into the long groove portion 43 and is restored to the state of FIG. 5.

Figure 17:
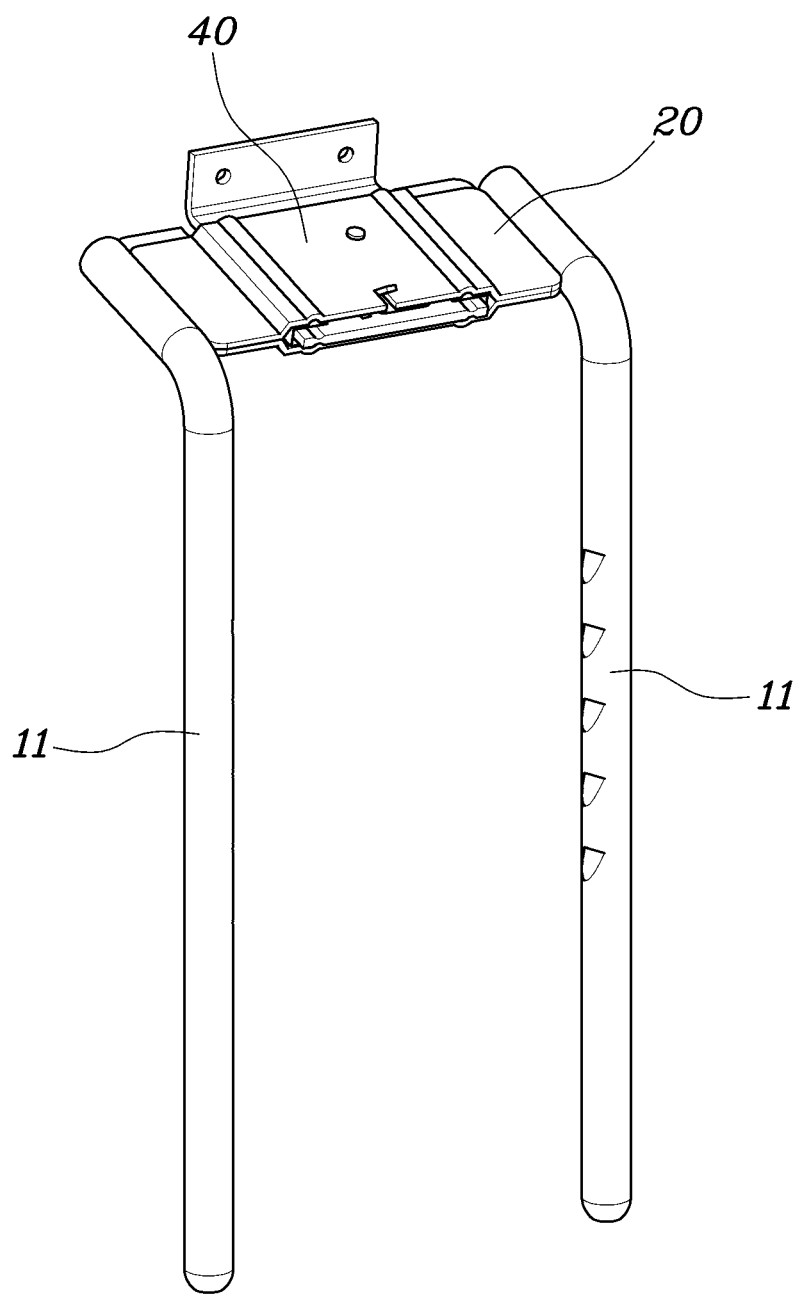
FIG. 17 is a view exemplarily illustrating the configuration of various exemplary embodiments of implementing forward/rearward adjustment operations of the moving plate combined with the fixed guide bracket according to an exemplary embodiment of the present invention.

Meanwhile, FIG. 17 is a view exemplarily illustrating the configuration of various exemplary embodiments of implementing forward/rearward adjustment operations of the moving plate combined with the fixed guide bracket. The slim headrest device includes: the fixed guide bracket 20 provided upside the seatback 10; the moving plate 40 to which the headrest is mounted, a first end portion of the moving plate being moved forward and rearward by being guided by the fixed guide bracket 20 and a second end portion thereof being formed in a shape bent upwards.

That is, the forward/rearward adjustment operation mechanism of the moving plate 40 is implemented in the same operation principle as the operation mechanism of the moving plate 40 of the various exemplary embodiments described above. However, the upward/downward adjustment operation mechanism is not implemented at the bent end portion of the moving plate 40 and the headrest is configured to be directly mounted to the bent end portion thereof.

Figure 18:
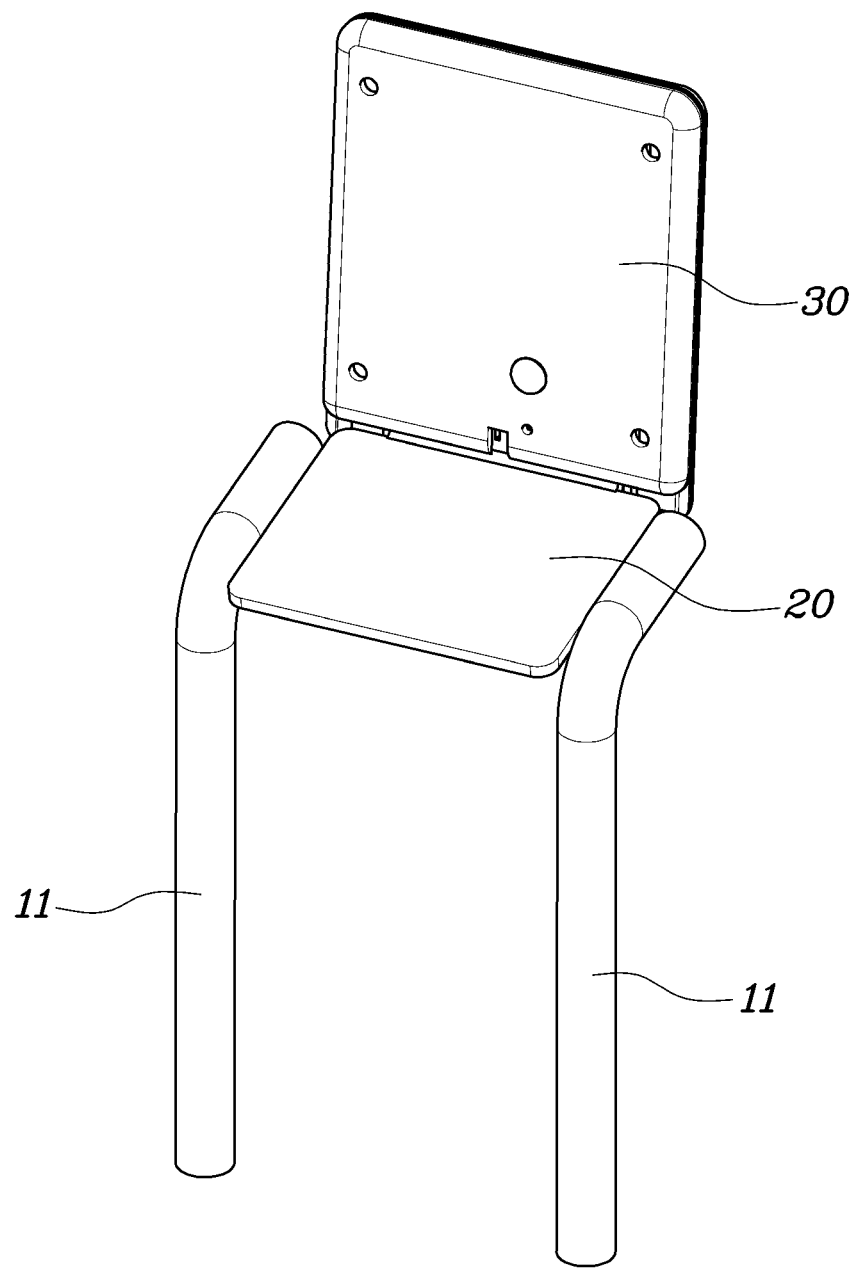
FIG. 18 is a view exemplarily illustrating the configuration of various exemplary embodiments of implementing upward/downward adjustment operations of the moving guide bracket combined with the fixed guide bracket according to an exemplary embodiment of the present invention.

FIG. 18 is a view exemplarily illustrating the configuration of various exemplary embodiments of implementing upward/downward adjustment operations of the moving guide bracket combined with the fixed guide bracket. The slim headrest device is configured by including: a fixed guide bracket 20 provided upside the seatback 10, the headrest being mounted to a first end portion of the fixed guide bracket 20; and the moving guide bracket 30 being moved upwardly and downwardly by being guided by a second end portion of the fixed guide bracket 20.

That is, the upward/downward adjustment operation mechanism of the moving guide bracket 30 is implemented in the same operation principle as the operation mechanism of the moving guide bracket 30 of the various exemplary embodiments described above, but the fixed guide bracket 20 connecting the stay with the moving guide bracket does not implement the upward/downward adjustment operation mechanism, but is configured to be fixed.

Figure 19:
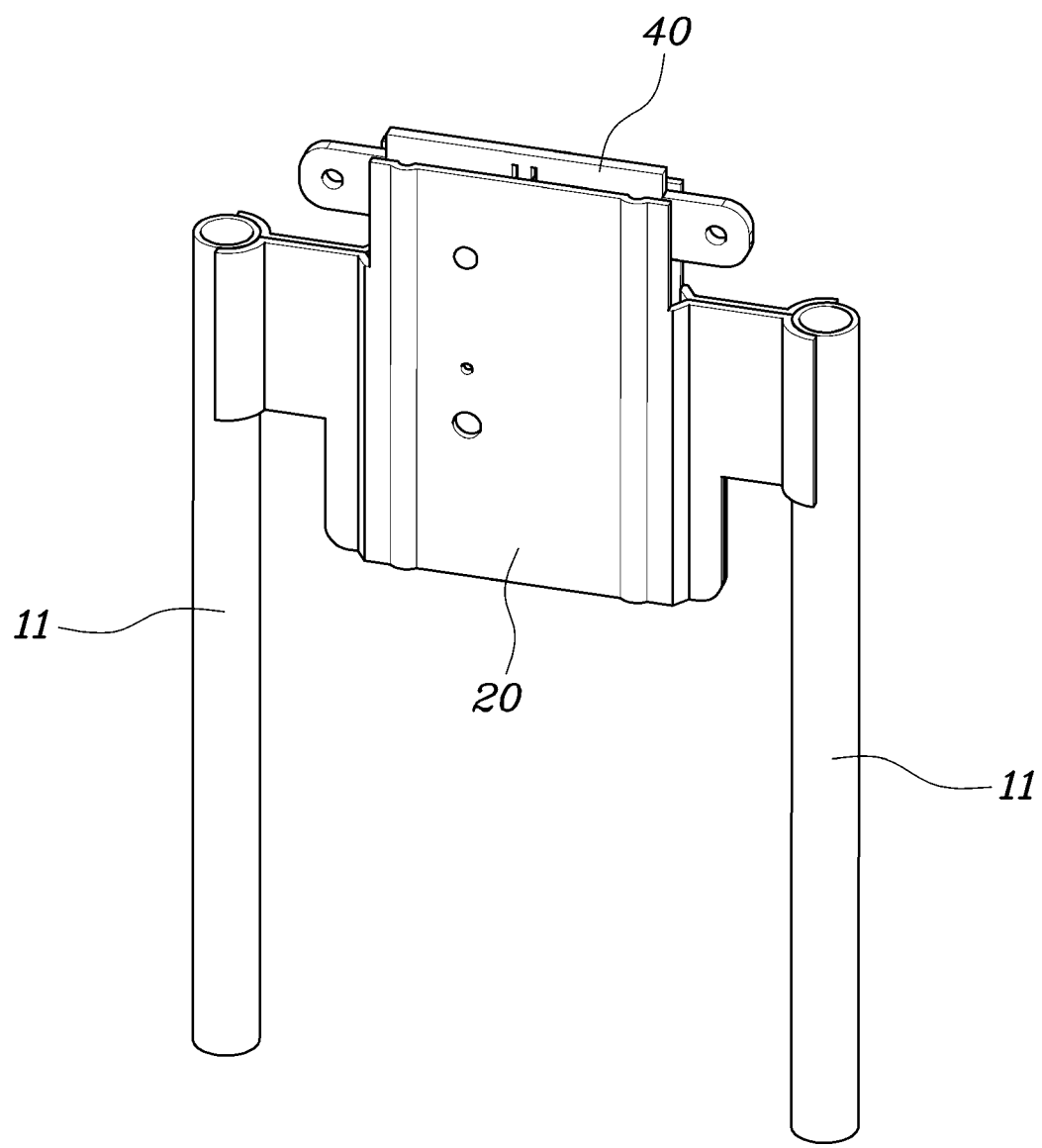
FIG. 19 is a view exemplarily illustrating the configuration of various exemplary embodiments of implementing upward/downward adjustment operations of the moving plate combined with the fixed guide bracket according to an exemplary embodiment of the present invention.

FIG. 19 is a view exemplarily illustrating the configuration of various exemplary embodiments of implementing the upward/downward adjustment operations of the moving plate combined with the fixed guide bracket. The slim headrest device of the present invention includes: the fixed guide bracket 20 provided upside the seatback 10; and the moving plate 40, a first end portion of which is moved upwardly and downwardly by being guided by the fixed guide bracket 20 and a second end portion of which has the headrest mounted thereto.

To this end, the stay 11 is mounted to each of the opposite sides of the upper portion of the seatback 10 in a vertically longitudinal direction thereof, and the fixed guide bracket 20 is combined with the stays 11 of the opposite sides therebetween.

Furthermore, the moving plate 40 is configured to slide upward and downward by inserting the lower end portion thereof into the fixed guide bracket 20.

That is, the upward/downward adjustment operation mechanism of the moving plate 40 is implemented in the same operation principle as the forward/rearward operation mechanism of the moving plate 40 of the various exemplary embodiments described above. Furthermore, the headrest is configured to be directly mounted to the upper end portion of the moving plate 40.

Figure 20:
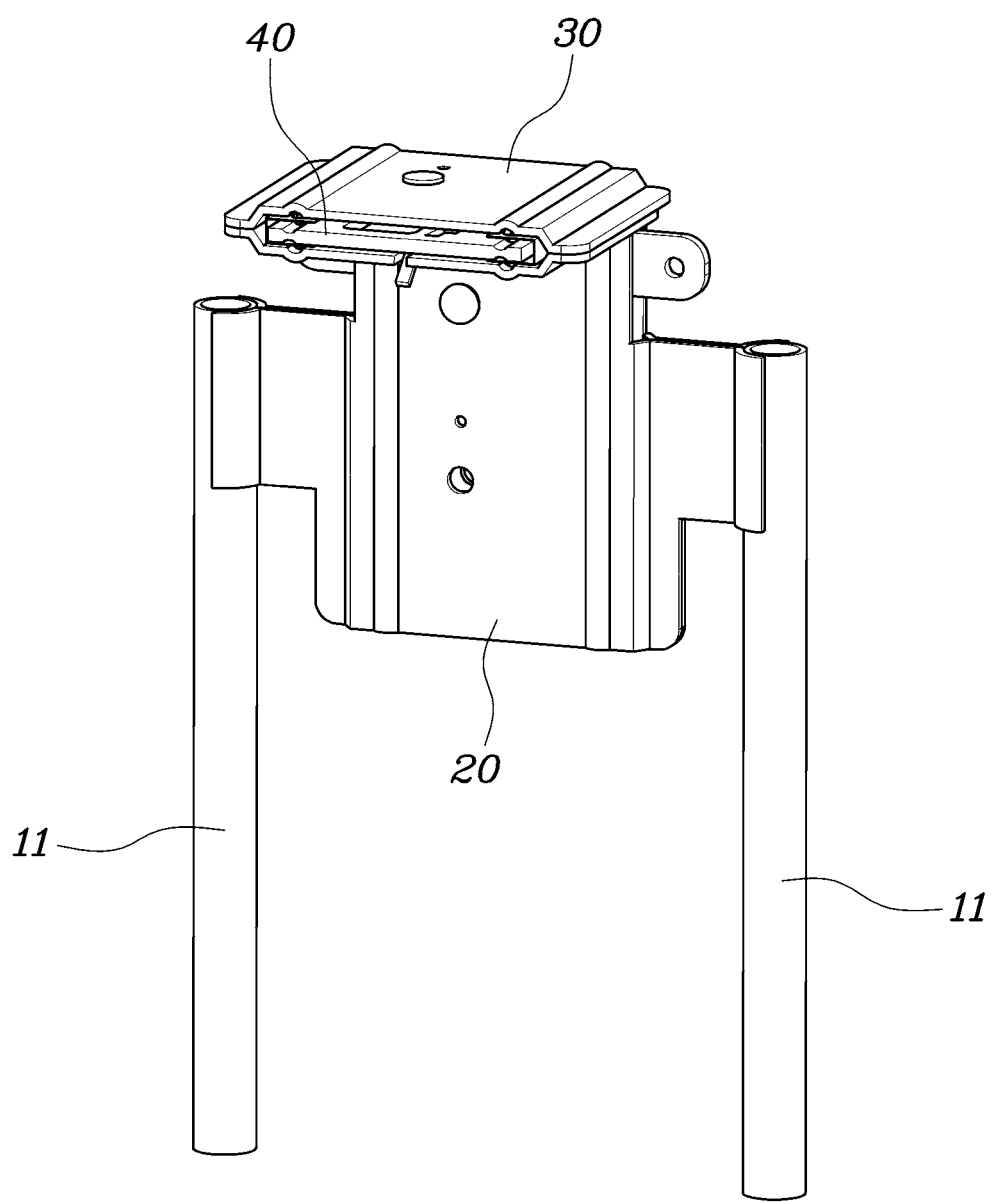
FIG. 20 is a view exemplarily illustrating the configuration of various exemplary embodiments of implementing upward/downward adjustment operations of the moving plate combined with the fixed guide bracket and forward/rearward adjustment operations of the moving guide bracket combined with the moving plate according to an exemplary embodiment of the present invention.

FIG. 20 is a view exemplarily illustrating the configuration of various exemplary embodiments of implementing upward/downward adjustment operations of the moving plate combined with the fixed guide bracket and forward/rearward adjustment operations of the moving guide bracket combined with the moving plate. The slim headrest device is configured to include: the fixed guide bracket 20 provided upside the seatback 10; the moving plate 40, a first end portion of which is moved upwardly and downwardly by being guided by the fixed guide bracket 20 and a second end portion of which is in a shape bent forward or rearward thereof; and the moving guide bracket 30, a first end portion of which has the headrest mounted thereto and a second end portion of which is moved forward and rearward by being guided by the second end portion of the moving plate 40.

To this end, the stay 11 is mounted to each of the opposite sides of the upper portion of the seatback 10 in a vertically longitudinal direction thereof, and the fixed guide bracket 20 is combined with the stays 11 on the opposite sides therebetween.

Furthermore, the moving plate 40 is configured to slide upward and downward by having the lower end portion thereof inserted into the fixed guide bracket 20.

Furthermore, a bent portion of the moving plate 40 is inserted into the moving guide bracket 30, and accordingly, the moving guide bracket 30 is configured to slide forward and rearward thereof.

That is, the upward/downward adjustment operation of the moving plate 40 is implemented in the same operation principle as the forward/rearward adjustment operation mechanism of the moving plate 40 of the various exemplary embodiments described above. Furthermore, the forward/rearward adjustment operation of the moving guide bracket 30 is implemented in the same operation principle as the upward/downward adjustment operation mechanism of the moving guide bracket 30 of the various exemplary embodiments described above.

Although the exemplary embodiments of the present invention have been described for illustrative purposes, those skilled in the art will appreciate that various modifications, additions and substitutions are possible, without departing from the scope and spirit of the present invention as included in the accompanying claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A headrest device comprising:
    a fixed guide bracket provided upside a seatback;
    a moving plate, a first end portion of which is moved forward and rearward by being guided by the fixed guide bracket and a second end portion of which is in a shape bent upward thereof;
    a moving guide bracket to which a headrest is mounted and engaged to the moving plate, wherein the moving guide bracket is configured to be moved upwardly and downwardly by being guided by the second end portion of the moving plate;
    a first ratchet rotatably mounted to the fixed guide bracket;
    a first ratchet gear provided in the moving plate, the first ratchet gear defining a holding structure in cooperation with the first ratchet as a shape of allowing a forward movement of the moving plate and limiting a rearward movement thereof; and
    a first plate elastic member including a first end portion and a second end portion and configured of allowing the rearward movement of the moving plate by releasing the first ratchet from the first ratchet gear as the first plate elastic member is rotated in cooperation with the first ratchet by coming into contact with the first ratchet at a position of maximum forward movement of the moving plate.

2. The device of claim 1, wherein
    an operation space portion is provided by having a middle portion of the moving plate drilled;
    the first ratchet is provided in a middle portion of the operation space portion;

the first ratchet gear is provided on an internal wall surface of the operation space portion; and the first plate elastic member is provided along the first ratchet gear, wherein the first ratchet has a hinge shaft combined thereto in a direction orthogonal to a moving direction of the moving plate to be rotated; and the first ratchet gear is provided at a position opposite to the first ratchet so that the first ratchet is held therein, the first ratchet gear being provided in plural along the moving direction of the moving plate so that the first ratchet is held therein in a plurality of levels, wherein a holding protrusion of a wedge shape is provided at a first end portion of the first ratchet; and the first ratchet gear has a support surface provided therein in a direction orthogonal to the moving direction of the moving plate, wherein an inclined surface is slantingly provided rearward from an internal end portion of the support surface to have a tooth shape.

3. The device of claim 2, further including:

a first locking elastic member supplying an elastic force in a rotation direction of the first ratchet, the first locking elastic member supplying the elastic force by changing in one rotation direction of a rotation direction of a holding protrusion of the first ratchet being held in the first ratchet gear and a rotation direction of the holding protrusion thereof being released from being held in the first ratchet gear as a rotational displacement of the first ratchet changes.

4. The device of claim 1, wherein a push protrusion is provided in a second end portion of the first ratchet;

a release protrusion is provided at the second end portion of the first plate elastic member opposite to the push protrusion, so that the release protrusion is selectively in contact with and pressed by the push protrusion; and the first plate elastic member is rotated while being moved forward by being guided by the moving plate in a response that the release protrusion is pressed by the push protrusion, wherein a guide protrusion is provided in the moving plate by protruding therefrom toward the first plate elastic member;

a guide hole is provided in the first plate elastic member in a longitudinal direction thereof along forward/rearward moving directions thereof; and the guide protrusion is inserted into the guide hole, so that the first plate elastic member is moved by being guided along the guide hole, wherein a rotation protrusion is provided at the second end portion of the first plate elastic member toward the moving plate, the rotation protrusion being provided at a second end portion of the moving plate opposite to the rotation protrusion by having a long groove portion and a short groove portion provided to be different in front to rear lengths along a rotation direction of the first plate elastic member to have a step; and a width of the long groove portion is formed to be longer than a width of the rotation protrusion, so that the rotation protrusion is rotated in a direction of the short groove portion inside the long groove portion relative to the guide protrusion by operation of the push protrusion being pressed by the release protrusion, wherein a locking operation protrusion is provided in a middle portion of the first plate elastic member, wherein the locking operation protrusion is positioned to overlap a portion of a gear groove provided at a rearmost portion of the first ratchet gear while the rotation protrusion is rotated in the long groove portion by pressing of the release protrusion; and a holding protrusion provided at a first end portion of the first ratchet pushes the locking operation protrusion forward by being moved forward along an inclined surface of a rearmost gear groove, so that the first plate elastic member is moved forward, wherein while the first plate elastic member is moved to a front portion of the moving plate from a rear portion thereof, the rotation protrusion is moved into the short groove portion from the long groove portion while the first plate elastic member is rotated relative to the guide protrusion; and while the first plate elastic member is moved to the rear portion of the moving plate from the front portion thereof, the rotation protrusion is moved into the long groove portion from the short groove portion while the first plate elastic member is rotated relative to the guide protrusion, wherein as the push protrusion is pressed by the release protrusion with the rotation protrusion positioned inside the short groove portion, the first ratchet is rotated and released from the first ratchet gear.

5. The device of claim 1, wherein a release press portion is provided in a front of the moving plate opposite to a first end portion of the first ratchet, so that the release press portion selectively contacts with and is pressed by the first end portion of the first ratchet; and the first ratchet is rotated and held in the first ratchet gear as the release press portion is pressed by the first end portion of the first ratchet, wherein a ratchet guide surface is provided on an external surface of the first ratchet continuous to a second end portion of the first ratchet from the first end portion of the first ratchet, wherein a first section having a holding protrusion of the first ratchet includes a flat surface, a second section continuous to the first section includes a convex surface, and a third section continuous to the second section includes a flat surface; and a plate guide surface of a shape corresponding to the ratchet guide surface is provided on an internal surface of the release press portion opposite to the ratchet guide surface, so a rotation of the first ratchet is guided while the ratchet guide surface is in contact with the plate guide surface, wherein a release operation protrusion is provided in the first end portion of the first plate elastic member;

the release operation protrusion is located to overlap a portion of a gear groove provided at a front of the first ratchet gear in a response that the release press portion is located at a position of being pressed by the first end portion of the first ratchet; and a holding protrusion provided at the first end portion of the first ratchet presses the release operation protrusion located inside the gear groove as the release press portion presses the first end portion of the first ratchet, so that the first plate elastic member is moved rearward while being rotated to a locking operation position relative to a guide protrusion.

6. The device of claim 5, further including:

a first return elastic member supplying an elastic force in a rearward moving direction of the first plate elastic member.

7. The device of claim 1, wherein a bearing structure is provided between the fixed guide bracket and the moving plate to slide the moving plate forward and rearward thereof, wherein the bearing structure includes:
a ball case formed in a shape of covering a side edge portion of the moving plate and having a ball hole provided in a longitudinal direction thereof; and
a ball fitted into the ball hole, a spheric surface of the ball of a side relative to the ball hole being roll-supported by the moving plate and a spheric surface of the ball of an opposite side of the side being roll-supported by an internal surface of the fixed guide bracket.

8. The device of claim 1, further including:
a second ratchet rotatably mounted to the moving guide bracket;
a second ratchet gear provided in the moving plate, the second ratchet gear defining a holding structure in cooperation with the second ratchet as a shape of allowing an upward movement of the moving guide bracket and limiting a downward movement thereof; and
a second plate elastic member having a first end portion and a second end portion and configured of allowing a downward movement of the moving guide bracket by releasing the second ratchet from the second ratchet gear by rotating in cooperation with the second ratchet by coming into contact with the second ratchet at a position of maximum upward movement of the moving guide bracket the moving guide bracket,
wherein an operation space portion is provided by having a middle portion of the second end portion of the moving plate drilled;
the second ratchet is provided in a middle portion of the operation space portion;
the second ratchet gear is provided on an internal wall surface of the operation space portion; and
the second plate elastic member is provided along the second ratchet gear,
wherein the second ratchet has a hinge shaft combined thereto in a direction orthogonal to a moving direction of the moving guide bracket to perform hinge rotation, and
the second ratchet gear is provided at a position opposite to the second ratchet so that the second ratchet is held therein and is provided in plural along the moving direction of the moving guide bracket so that the second ratchet is held therein in a plurality of levels,
wherein a holding protrusion of a wedge shape is provided at a first end portion of the second ratchet; and
the second ratchet gear has a support surface provided therein in a direction orthogonal to the moving direction of the moving guide bracket, wherein an inclined surface is slantingly provided upwards from an internal end portion of the support surface to have a tooth shape.

9. The device of claim 8, further including:
a second locking elastic member including a first end portion and a second end portion and supplying an elastic force in a rotation direction of the second ratchet, the second locking elastic member supplying the elastic force by changing in one rotation direction of a rotation direction of a holding protrusion of the second ratchet being held in the second ratchet gear and a rotation direction of the holding protrusion thereof being released from being held in the second ratchet gear as a rotational displacement of the second ratchet changes,
wherein a push protrusion is provided at a second end portion of the second ratchet;
a release protrusion is provided at the second end portion of the second plate elastic member opposite to the push protrusion, so that the release protrusion is in contact with and pressed by the push protrusion; and
the second plate elastic member is rotated while being moved downwards by being guided by the moving plate in a response that the release protrusion is pressed by the push protrusion,
wherein a guide protrusion is provided in the moving plate by protruding therefrom toward the second plate elastic member;
a guide hole is provided in the second plate elastic member in a longitudinal direction thereof along upward/downward moving directions thereof, and
the guide protrusion is inserted into the guide hole, so that the second plate elastic member is moved by being guided along the guide hole,
wherein a rotation protrusion is provided at the second end portion of the second plate elastic member toward the moving plate, wherein the rotation protrusion is provided at an upper end portion of the moving plate opposite to the rotation protrusion by having a long groove portion and a short groove portion provided to be different in vertical lengths along a rotation direction of the first plate elastic member to have a step; and
a width of the long groove portion is formed to be longer than a width of the rotation protrusion, so that the rotation protrusion is rotated in a direction of the short groove portion inside the long groove portion relative to the guide protrusion by operation of the push protrusion being pressed by the release protrusion,
wherein a locking operation protrusion is provided in a middle portion of the second plate elastic member, wherein the locking operation protrusion is positioned to overlap a portion of a gear groove provided at an uppermost portion of the second ratchet gear while a rotation protrusion is rotated in the long groove portion by pressing of the release protrusion; and
a holding protrusion provided at the first end portion of the second ratchet pushes the locking operation protrusion downward by being moved downwards along an inclined surface of an uppermost gear groove, so that the second plate elastic member is moved downward,
wherein while the second plate elastic member is moved to a lower portion of the moving plate from an upper portion thereof, the rotation protrusion is moved into the short groove portion from the long groove portion while the second plate elastic member is rotated relative to the guide protrusion; and
while the second plate elastic member is moved to the upper portion of the moving plate from the lower portion thereof, the rotation protrusion is moved into the long groove portion from the short groove portion while the second plate elastic member is rotated relative to the guide protrusion,
wherein as the push protrusion is pressed by the release protrusion with the rotation protrusion positioned inside the short groove portion, the second ratchet is rotated and released from the second ratchet gear.

10. The device of claim 9,
wherein a release operation protrusion is provided in the first end portion of the second plate elastic member;
wherein the release operation protrusion is located to overlap a portion of a gear groove provided in a lower portion of the second ratchet gear in a response that the first end portion of the second ratchet is located at a position of being pressed by the release press portion; and wherein a holding protrusion provided at the first end portion of the second ratchet presses the release operation protrusion located inside the gear groove as the first end portion of the second ratchet presses the release press portion, so that the second plate elastic member is moved upward while being rotated to a locking operation position relative to a guide protrusion.

11. The device of claim 10, further including:

a second return elastic member supplying an elastic force in an upward moving direction of the second plate elastic member.

12. The device of claim 8, wherein a release press portion is provided in a lower portion of the moving plate opposite to the first end portion of the second ratchet, so that the first end portion of the second ratchet contacts with and is pressed by the release press portion; and the second ratchet is rotated and held in the second ratchet gear as the first end portion of the second ratchet is pressed by the release press portion.

13. The device of claim 12, wherein a ratchet guide surface is provided on an external surface of the second ratchet continuous to a second end portion of the second ratchet from the first end portion of the second ratchet, wherein a first section having a holding protrusion of the second ratchet includes a flat surface, a second section continuous to the first section includes a convex surface, and a third section continuous to the second section includes a flat surface; and wherein a plate guide surface of a shape corresponding to the ratchet guide surface is provided at a portion of the moving plate opposite to the ratchet guide surface, so that a rotation of the second ratchet is guided while the ratchet guide contacts with the plate guide surface.

* * * * *